(12) United States Patent
Shimizu et al.

(10) Patent No.: US 10,011,183 B2
(45) Date of Patent: Jul. 3, 2018

(54) OPTIMIZED CHARGING AND DISCHARGING OF A PLUG-IN ELECTRIC VEHICLE

(71) Applicant: TOYOTA JIDOSHA KABUSHIKI KAISHA, Toyota-shi, Aichi-ken (JP)

(72) Inventors: Takayuki Shimizu, Mountain View, CA (US); Kenichi Murakami, Cupertino, CA (US); Kunihiko Kumita, Toyota (JP); Tomoya Ohno, Toyota (JP)

(*) Notice: Subject to any disclaimer, the term of this patent is extended or adjusted under 35 U.S.C. 154(b) by 233 days.

(21) Appl. No.: 15/065,471

(22) Filed: Mar. 9, 2016

(65) Prior Publication Data

US 2017/0259683 A1 Sep. 14, 2017

(51) Int. Cl.
*H02J 7/00* (2006.01)
*B60L 11/18* (2006.01)

(52) U.S. Cl.
CPC ....... *B60L 11/1844* (2013.01); *B60L 11/1842* (2013.01); *B60L 11/1848* (2013.01); *B60L 11/1861* (2013.01)

(58) Field of Classification Search
CPC .................................................. B60L 11/1844
USPC ......................................................... 320/109
See application file for complete search history.

(56) References Cited

U.S. PATENT DOCUMENTS

| | | | |
|---|---|---|---|
| 2009/0066287 A1* | 3/2009 | Pollack | G06Q 50/00 320/101 |
| 2010/0017045 A1* | 1/2010 | Nesler | B60L 11/1824 700/296 |
| 2011/0133684 A1* | 6/2011 | Eikeland | B60L 11/1824 320/101 |
| 2013/0184884 A1 | 7/2013 | More | |
| 2014/0222237 A1 | 8/2014 | Hibiya et al. | |
| 2014/0253037 A1* | 9/2014 | Yano | B60L 11/1838 320/109 |
| 2015/0283912 A1 | 10/2015 | Shimizu et al. | |

FOREIGN PATENT DOCUMENTS

| | | |
|---|---|---|
| JP | 2013-544064 | 12/2013 |
| JP | 2015-233413 | 12/2015 |
| WO | WO2012-061522 | 5/2012 |

* cited by examiner

*Primary Examiner* — Suchin Parihar
(74) *Attorney, Agent, or Firm* — Burbage Law, P.C.; Jon-Michael Burbage; Elizabeth Ruzich

(57) ABSTRACT

The disclosure includes a system and method for charging and discharging a Plug-in Electric Vehicle ("PEV"). The method may include determining that first event data describes a Renewable Energy Output Control event ("REOC event") including instructions directing a Renewable Energy Power Generation facility ("REPG facility") to not output power to a power grid during a time period specified by the REOC event. The method may include the REPG facility charging a battery system included in a PEV during the REOC event. The battery system may be coupled to the REPG facility via a coupling that does not including the power grid. The battery system may be charged by the REPG facility via the coupling with power generated by the REPG facility during the first duration of the REOC event so that the REPG facility continues to generate power during the REOC event.

20 Claims, 15 Drawing Sheets

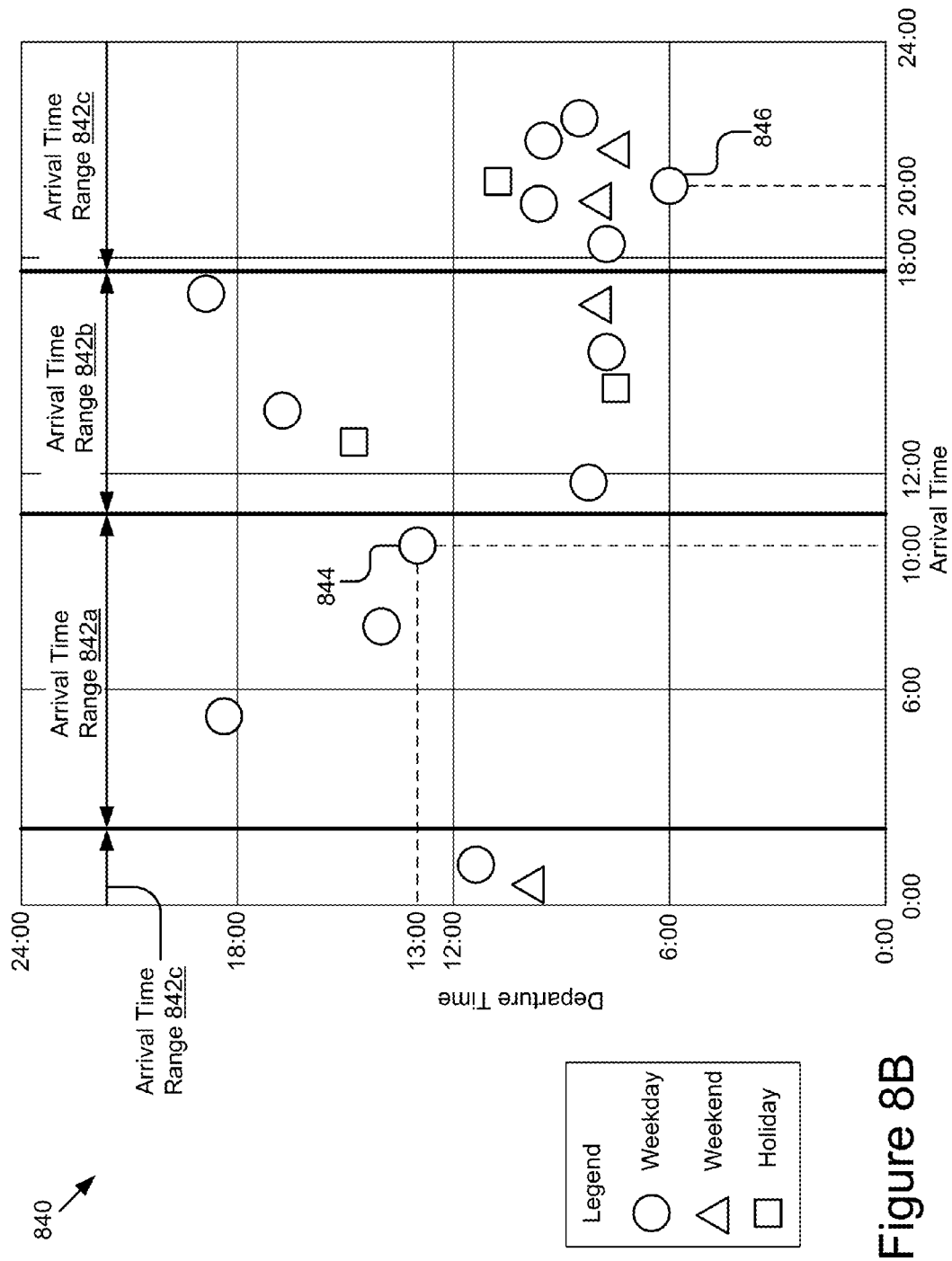

OPTIMIZED CHARGING AND DISCHARGING OF A PLUG-IN ELECTRIC VEHICLE

BACKGROUND

The specification relates to optimized charging and discharging of a plug-in electric vehicle. In particular, the specification relates to optimizing the charging and discharging for a plug-in electric vehicle based on one or more of a demand response event and a renewable energy control event.

Renewable energy sources are increasing in popularity. Power producers operating renewable energy-based power generation facilities may push the electricity they generate to the electrical grid owned and operated by a utility provider. The utility purchases the renewable energy from the operator of the renewable energy-based power generation facilities. Sometimes the utility cannot buy or receive the renewable energy because doing so will cause and imbalance of supply or demand in the power grid. The utility issues a Renewable Energy Output-Control event to inform renewable energy-based power generation facilities that the utility cannot buy or receive the renewable energy they produce.

SUMMARY

The problem created by a utility issuing a Renewable Energy Output-Control event (herein "REOC event" or "REOC events") is that the renewable energy-based power generation facility stops production of renewable energy. An optimization system described herein helps to solve the problem using one or more Plug-in Electric Vehicles (herein, "PEV" or "PEVs"). In doing so, the optimization system also solves a problem for the user of PEVs by optimizing their PEV charging schedule and charging their PEV so that it has sufficient energy for the next journey the user will take in the future.

In some implementations, the optimization system described herein is operable to cause a PEV to store the renewable energy produced by renewable energy-based power generation facilities in the batteries of a PEV whenever a REOC event is issued by a utility. The PEV may discharge some stored power stored in its batteries during Demand Response events (herein, "DR event" or "DR events") or when electricity is more expensive. My invention optimizes a charging or discharging schedule for the PEV based on one or more of the following: REOC events; DR events; Time of Use rate structures (herein, "TOU rate structure" or "TOU rate structures"); and the PEV user's charging requirement (e.g., how much energy they will need stored in the PEV for their next day's journeys).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: determining that first event data describes a REOC event including instructions for operating a REPG facility during a first duration of the REOC event, where the instructions direct the REPG facility to not output power to a power grid during the first duration of the REOC event; and charging a battery system included in a PEV during the first duration of the REOC event, where the battery system is coupled to the REPG facility via a coupling that does not including the power grid and charged by the REPG facility via the coupling with power generated by the REPG facility during the first duration of the REOC event so that the REPG facility continues to generate power during the REOC event. Other implementations of this aspect include corresponding computer systems, apparatus, and computer programs recorded on one or more computer storage devices, each configured to perform the actions of the methods.

Implementations may include one or more of the following features. The method where the battery system of the PEV is coupled to the power grid and the method further includes: determining that second event data describes a DR event; and discharging at least some of the power stored in the battery system of the PEV to the power grid during a second duration of the DR event. The method further including: monitoring a wattage of power discharged to the power grid; determining a cost of the wattage based on a charge schedule describing the cost of the wattage during the DR event; storing discharge data describing the wattage discharged by the battery system of the PEV to the power grid during the DR event and the cost of the wattage; and providing the discharge data to a utility for reimbursement based on the cost of the wattage. The method further including: estimating a next journey that the PEV will take; estimating a departure time when the next journey will start; estimating a journey power value describing how much wattage the PEV will consume to complete the next journey; determining a PEV power value describing how much wattage the battery system is currently storing; calculating a charge time occurring between an end of the DR event and the departure time; estimating a charge time power value describing how much wattage can be stored in the battery system during the charge time; determining a maximum discharge value that is a maximum amount of wattage discharged by the battery system of the PEV to the power grid during the DR event so that the battery system is storing the journey power value at the departure time, where the maximum discharge value is determined based on one or more of the journey power value, the PEV power value and the charge time power value; and where the discharging to the power grid is limited to the maximum discharge value. The method where the battery system of the PEV is coupled to the power grid and the method further includes: identifying a time period when the cost of power is expensive relative to historical cost based on a charge schedule describing the cost of the power during the time period and the historical cost; and discharging at least some of the power stored in the battery system of the PEV to the power grid during the time period. The method further where the charge schedule is stored as charge schedule data in a non-transitory memory of a charging system that is coupled to the coupling and the PEV to transmit power from the coupling to the PEV. The method further including the charging system being located within a range of 0.01 centimeters and 100 meters from the PEV. The method where the charging system is operated by a user of the PEV. The method where the charging system is operated by the REPG facility. The method where the charge schedule is published by a utility and transmitted to the charging system and the REPG facility via a network that is communicatively coupled to the charging system, the REPG facility and the utility. The method where the network includes a wireless network. The method where the utility also publishes the first event data. The method where the PEV may be an autonomous vehicle. The method where the PEV may include an electric engine and a combustion engine. The method where determining the maximum discharge value comprises solving for the following equation: maximum discharge value=charge time power value−journey power value+PEV power value. Implementations of the described techniques may include hardware, a method or process, or computer software on a computer-accessible medium. The method where the PEV discharges at least some of the power stored in the battery system of the PEV to a main of a home or residence during the time period. The method where the PEV discharges at least some of the power stored in the battery system of the PEV to a second battery system of a second PEV during the time period.

One general aspect includes a system including: a PEV coupled to a charging system; where the PEV includes a battery system operable to be charged by the charging system, a processor and an optimization system, where the optimization system includes computer-readable code that, when executed by the processor, cause the processor to perform steps including: determining that event data describes a REOC event including instructions for operating a REPG facility during a duration of the REOC event, where the instructions direct the REPG facility to not output power to a power grid during the duration of the REOC event; and charging the battery system included in the PEV during the duration of the REOC event, where the battery system is coupled to the REPG facility via a coupling that does not including the power grid and charged by the REPG facility via the coupling with power generated by the REPG facility during the duration of the REOC event so that the REPG facility continues to generate power during the REOC event. Other implementations of this aspect include corresponding computer systems, apparatus, and computer programs recorded on one or more computer storage devices, each configured to perform the actions of the methods.

One general aspect includes a computer program product including a non-transitory computer-usable medium including a computer-readable program, where the computer-readable program when executed on a computer causes the computer to: determining that event data describes a REOC event including instructions for operating a REPG facility during a duration of the REOC event, where the instructions direct the REPG facility to not output power to a power grid during the duration of the REOC event; and charging a battery system included in a PEV during the duration of the REOC event, where the battery system is coupled to the REPG facility via a coupling that does not including the power grid and charged by the REPG facility via the coupling with power generated by the REPG facility during the duration of the REOC event so that the REPG facility continues to generate power during the REOC event. Other implementations of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 8B is a graphic representation illustrating an example graphic showing a relationship between vehicle arrival times and vehicle departure times.

DETAILED DESCRIPTION

A Renewable Energy Power Generation facility (herein "REPG facility" or "REPG facilities") generates renewable electricity using one or more of the following renewable energy sources: solar panels; windmills; geothermal; ocean waves; etc. Ordinarily this renewable energy is sold to a utility for a profit and pushed to the power grid managed by the utility. The utility monitors the supply of electricity on the power grid and the demand for the electricity on the power grid. Historically, the demand may be greatest between the hours of 2:00 PM and 8:00 PM. The supply of energy on the power grid can vary. The utility seeks to maintain balance in the supply and demand of power on the power grid.

In some implementations, the REPG facilities may be individual homeowners having solar panels on their homes or large facilities that generate renewable energy on a commercial scale.

Sometimes the utility is unable to accept the renewable energy from the REPG facilities because doing so would cause an imbalance of the supply and demand of electricity on the power grid. When this happens the utility uses communication means to transmit a Renewable Energy Output-Control event (herein, "REOC event" or "REOC events") to the REPG facilities. The REOC event may include REOC data that is a signal to the REPG facility that the utility will not be able to buy or accept any renewable energy they produce because doing so would cause an imbalance on the power grid.

In some implementations, responsive to the receipt of a REOC event, the renewable REPG facility is forced to either stop production of renewable energy or temporarily store the renewable energy in large battery banks. These battery banks are an expense for the REPG facility and may increase the cost of renewable energy or discourage the production of renewable energy because, for example, they decrease the profit margins associated with production of renewable energy. The battery banks themselves also produce undesirable waste associated with the landfill disposal of the batteries included in the battery banks as the batteries run the course of their useful service life. These battery banks are also expensive to install, maintain and repair, which further increases the overhead of renewable energy production and discourages the production of renewable energy.

My invention enables the REPG facility to store their renewable energy in the batteries of Plug-in Electric Vehicles (herein "PEV" or "PEVs") during REOC events. Storing the renewable energy in the batteries of the PEV beneficially charges the batteries of the PEV (which benefits the owner of the PEV) and enables the operator of the REPG facility to continue to produce renewable energy during REOC events without having to undertake the trouble and expense of storing energy in a battery bank.

System Overview

Figure 1:
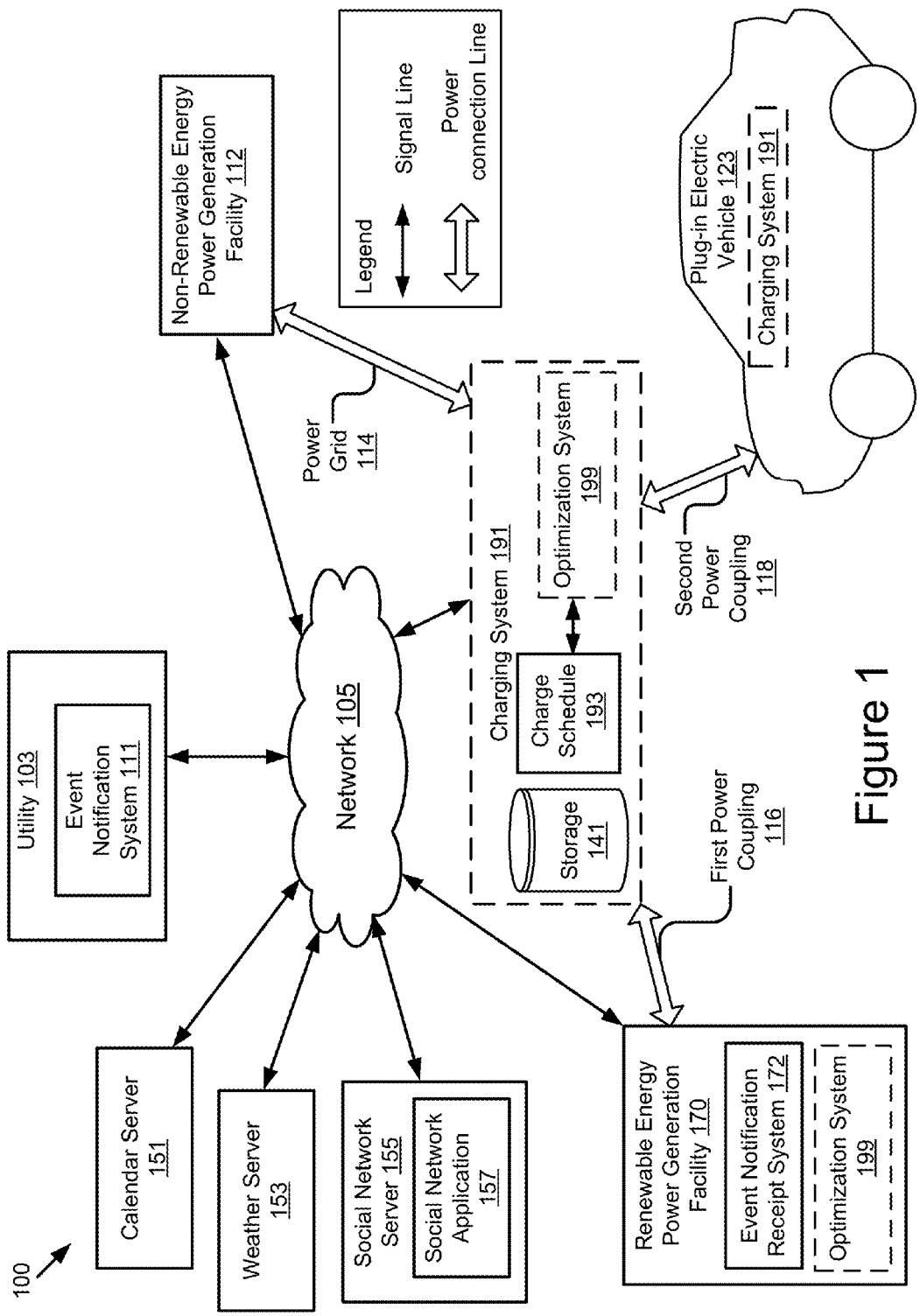
FIG. 1 is a block diagram illustrating an example system for performing one or more vehicle functions responsive to a Renewable Energy Output Control event.

FIG. 1 illustrates a block diagram of some implementations of a system 100 for performing one or more vehicle functions responsive to a REOC event.

The illustrated system 100 includes: a utility 103; a non-renewable energy power generation facility 112; a REPG facility 170; a PEV 123; a charging system 191; a social network server 155; a weather server 153; and a calendar server 151. In the illustrated implementation, these entities of the system 100 are communicatively coupled via a network 105. The system 100 may include other servers or devices not shown in FIG. 1 including, for example, a traffic server for providing traffic data, a power service server for providing power usage service (e.g., billing service), a map server for providing map data and a content server for providing content (e.g., music, videos, podcasts, etc.), etc.

The PEV 123 in FIG. 1 can be used by way of example. While FIG. 1 illustrates one PEV 123, the present disclosure applies to a system architecture having one or more PEVs 123. The one or more PEVs 123 may have one or more users. Furthermore, although FIG. 1 illustrates one network 105 coupled to the entities of the system 100, in practice, one or more networks 105 can be connected to these entities. Furthermore, while FIG. 1 includes one utility 103, one non-renewable energy power generation facility 112, one charging system 191, one REPG facility 170, one calendar server 151, one weather server 153, one social network server 155, the system 100 could include one or more of these entities. In addition, the separation of various components and servers in the implementations described herein should not be understood as requiring such separation in all implementations, and it should be understood that the described components, devices or servers can generally be integrated together in a single component, device or server.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, e-mail, millimeter wave communication, etc.

The PEV 123 may include an electric vehicle that may be recharged from an external source of electricity, such as a wall socket or the charging system 191. The PEV 123 may include a battery system. The battery system may include a set of rechargeable batteries. The electricity may be stored in the batteries. The electricity may be used to drive or contribute to the drive of the wheels of the PEV 123. The battery system of the PEV 123 is described in more detail below with reference to FIG. 2.

In some implementations, the PEV 123 may include an electric engine that drives the wheels of the PEV 123 or an electric engine and a combustion engine that work together to drive the wheels of the PEV 123 or drive the wheels separately at different times as configured by the user of the PEV 123.

The PEV 123 may include a set of one or more sensors. The sensor set may include any type of conventional sensors configured to collect any type of data. For example, the sensors included in the sensor set may be one of a navigation sensor (e.g., a global positioning system (GPS) sensor), an infrared detector, a motion detector, a thermostat, a sound detector, and any other type of sensors.

In some implementations, the sensor set may include a combination of different types of sensors. For example, the sensor set may include different sensors for measuring one or more of a current time, a location of the PEV 123 (e.g., a latitude, longitude, and altitude of a location), an acceleration of the PEV 123, a velocity of the PEV 123, a charge level of the battery system of the PEV 123, etc. The sensor set may generate sensor data describing the one or more measurements and send the sensor data to the charging system 191 which stores the sensor data in the storage device 141.

The charging system 191 may include a charge station that supplies electric power for recharging a battery system included in the PEV 123. For example, the charging system 191 may include a charge station to provide electric power for recharging battery systems in all-electric vehicles or plug-in hybrid electric vehicles such as the PEV 123. In some implementations, the charging system 191 may be a household charge station at a residence. In some other implementations, the charging system 191 may be a public charge station on a street or a parking lot.

In some implementations, the charging system 191 may include a computer system that is configured to send and receive communications with the network 105.

In some implementations, the charging system 191 can be an independent system that connects to the network 105.

In some implementations, the charging system 191 may be an element of one or more of the REPG facility and the PEV 123.

The charging system 191 may be coupled to one or more of the following: a power grid 114, a first power coupling 116; and a second power coupling 118.

The power grid 114 may be a conventional power grid or electrical grid.

The first power coupling 116 is a coupling operable to transmit power from the REPG facility 170 to the charging system 191 without use of the power grid. For example, no portion of the first power coupling 116 is in any way connected to the power grid 114 or operable to pass a current through the power grid 114.

In some implementations, the first power coupling 116 may include one or more one or more high-voltage transmission lines that carry power from the REPG facility 170 to a demand center and one or more distribution lines that couple the demand center to the charging system 191.

In some implementations, the first power coupling 116 may include one or more of the following: one or more electrical wires; one or more breakers; one or more power plugs; one or more power sockets; one or more step up transformers; one or more strep down transformers; one or more power inventers; and one or more other conventional elements of a residential or commercial power distribution network.

In some implementations, the REPG facility 170 is a solar power generation facility or wind power generation facility located at a residence associated with the PEV 123. For example, the REPG facility 170 is located at a residence and operated by a user of the PEV 123. In these implementations the first power coupling 116 may include a distribution line or some other power line to transmit power from the REPG facility 170 to the charging system 191.

The second power coupling 118 may include one or more power lines. In some implementations, the second power coupling 118 may couple the charging system 191 to the PEV 123 and transmits power from the charging system 191 to the PEV 123. The second power coupling 118 may transmit power without use of the power grid 114.

In some implementations, the second power coupling 118 may include one or more of the following: one or more electrical wires; one or more breakers; one or more power plugs; one or more power sockets; one or more step up transformers; one or more strep down transformers; one or more power inventers; and one or more other conventional elements of a residential or commercial power distribution network.

In some implementations, the charging system 191 may be an element of the PEV 123 and the first power coupling 116 is directly coupled to the PEV 123. In these implementations the second power coupling 118 may not be included in the system 100 and the first power coupling 116 may include one or more of the elements of the second power coupling 118.

In some implementations, the charging system 191 may be an element of the REPG facility 170 and the first power coupling 116 is directly coupled to the PEV 123. In these implementations the second power coupling 118 may not be included in the system 100 and the first power coupling 116 may include one or more of the elements of the second power coupling 118.

The charging system 191 is drawn in FIG. 1 using a dashed line to indicate that it may be an element of the PEV 123 or an independent entity of the system 100.

The charging system 191 may include one or more of the following: a charge scheduling 193; an optimization system 199; and a storage device 141.

The charge schedule 193 may include data describing a Time-of-Use rate structure (herein "TOU rate structure") for the utility 103. The TOU rate structure may describe the different prices charged by the utility 103 for power under different conditions, i.e., time-of-use pricing (herein "TOU pricing"). The TOU rate structure may also describe historical patterns of power usage by consumers of the power sold by the utility 103.

For example, the price per watt of power sold by the utility 103 may vary based on one or more factors such as: time of day; demand by consumers; supply of power on the power grid 114; the presence of a REOC event; the presence of a demand response event (herein "DR event" or "DR events"); weather conditions affecting energy consumption or energy production; a day of the week that affects energy consumption or energy production; a presence of a holiday or other event on the day of the week that affects energy consumption or energy production; a historical pattern of energy usage by its consumers under various conditions as a predictor of future energy usage under similar conditions; an estimation of future demand by consumers; and other conventional factors that are included in a TOU pricing structure.

In some implementations, the TOU rate structure described by the charge schedule 193 may include electricity prices that are set for a specific time period on an advance or forward basis. The electricity prices may change over time and may be updated via the network 105 throughout the day, month or year. Prices paid for energy consumed during these periods may be pre-established and known to consumers in advance, allowing them to vary their usage in response to such prices and manage their energy costs by shifting usage to a lower cost period or reducing their consumption overall.

In some implementations, the TOU rate structure described by the charge schedule 193 may include a critical peak pricing structure. Under a critical peak pricing structure, TOU prices are in effect except for certain peak days, when the price per watt may reflect the costs of generating our purchasing electricity at the wholesale level. The pricing may be affected by one or more REOC events or one or more DR events.

In some implementations, the TOU rate structure described by the charge schedule 193 may include real-time pricing structure, i.e., dynamic pricing. Under real time pricing structure, electricity prices may change every hour, every 30 minutes, every 15 minutes, every 5 minutes or on a minute-by-minute basis. A price signal may be provided to the charging system 191 on an advanced or forward basis, reflecting the utility's 103 cost of generating or purchasing electricity at the wholesale level. The price signal may include one or more REOC events or one or more DR events.

The real-time pricing structure that may be described by the charge schedule 193 may be responsive to Demand Response (herein "DR"). DR may be described as the changes in electricity usage by end-use customers from their normal consumption patterns in response to changes in the price of electricity over time. DR may also relate to incentive payments designed to induce lower electricity use at times of high wholesale market prices or when the electricity grid is unreliable. DR includes all intentional modifications to consumption patterns of electricity of end-use customers that are intended to alter the timing, level of instantaneous demand, or the total electricity consumption. As such, the charge schedule 193 may vary over time based on REOC events and DR events.

The charge schedule 193 may be determined by the operators of the utility 103. The utility 103 may publish the charge schedule 193. For example, the charge schedule 193 may be published via the network 105.

The optimization system 199 includes code and routines configured to perform one or more vehicle functions. In some implementations, the optimization system 199 includes code and routines for determining and performing vehicle functions based at least in part on receipt of an event (e.g., a REOC event or a DR event) or identification of a change in price for electricity available on the power grid 114. In some implementations, the optimization system 199 includes code and routines for determining and performing vehicle functions at a destination location based in part on vehicle arrival time data associated with the destination location.

The optimization system 199 may be communicatively coupled to the network 105. For example, the optimization system 199 may receive one or more of the following from the network 105: content such as videos, music, podcasts, map updates; calendar data associated with the PEV 123 or the user of the PEV 123; weather data affecting the power grid 114 of consumption of electricity from the power grid 114; social network data affecting the power grid 114 of consumption of electricity from the power grid 114; journey data associated with the PEV 123 or the user of the PEV 123; one or more charge schedules 193; one or more REOC events; one or more DR events; one or more requests to receive power from the REPG facility 170; one or more requests to sell power from the utility 103.

In some implementations, a vehicle function may be a function performed in the PEV 123. For example, a vehicle function can be charging the PEV 123, controlling temperature in the PEV 123 (e.g., turning air-conditioner on or off, turning heat on or off), transferring data between the PEV 123 and a server (e.g., downloading videos, music, podcasts, map updates, etc. from the server via the network 105 to the PEV 123; uploading journey data stored in the PEV 123 to a cloud storage device), and transferring data between the PEV 123 and a client device of the user (e.g., transferring user calendar data from the user's smartphone to the PEV 123), etc. In another example, the optimization system 199 may transmit one or more of the following to the network 105 calendar data associated with the PEV 123 or the user of the PEV 123; journey data associated with the PEV 123 or the user of the PEV 123; one or more requests to store power generated by the REPG facility 170; one or more requests to sell power to the utility 103; one or more requests for reimbursement for power discharged to the power grid 114.

In some implementations, the vehicle function provided by the optimization system 199 may include responding to one or more of the following: a REOC event; a DR event; an increase in the price of electricity available on the power grid 114; a decrease in the price of electricity available on the power grid 114; a discharge of electricity from a battery system of the PEV 123 to the power grid 114. For example, responsive to an REOC event, the vehicle function may include storing power in a battery system of the PEV 123. In another example, responsive to a DR event, the vehicle function may include the battery system of the PEV 123 discharging power to the power grid 114. In yet another example, responsive to the battery system of the PEV 123 discharging power to the power grid 114, the vehicle function may include determining a price of the power released to the power grid 114 based on the charge schedule 193 and requesting a fee from the utility 103 for the price of the power discharged to the power grid 114.

In some implementations, the battery system of the PEV 123 may be coupled to the power grid 114 and the coupling may be operable to allow the battery system to discharge power to the power grid. In other implementations, the battery system of the PEV 123 may be coupled to the charging system 191 and the charging system 191 may be coupled to the power grid 114 and these couplings may be operable to allow the battery system to discharge power to the power grid 114 via the charging system 191.

In some implementations, the optimization system 199 may be an element of the REPG facility 170. In other implementations, the portions of the optimization system 199 may be provided by the REPG facility 170 and portions of the optimization system 199 may be provided by the charging system 191 and the REPG facility 170 and the charging system 191 cooperate with one another to provide the functionality described herein with reference to the optimization system 199.

In some implementations, the optimization system may be operable to cause a processor of the charging system 191 to execute one or more of the steps described below with reference to methods 400, 410, 412, 700, 1000 of FIGS. 4, 5, 6, 7, 10A, 10B and 10C.

In some implementations, the optimization system 199 can be implemented using hardware including a field-programmable gate array ("FPGA") or an application-specific integrated circuit ("ASIC"). In some other implementations, the optimization system 199 can be implemented using a combination of hardware and software. The optimization system 199 is described in more detail below with reference to FIGS. 2-11.

The storage device 141 can be a non-transitory storage medium that stores data for providing the functionality described herein. The storage device 141 may be a dynamic random access memory (DRAM) device, a static random access memory (SRAM) device, flash memory, or some other memory devices. In some implementations, the storage device 141 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the storage device 141 stores one or more of the following: charge schedule data describing the charge schedule 193; time synchronicity data, user journey data, user profile data, and other data associated with users of the PEV 123. The user journey data associated with a user can be data describing journeys taken by the user. For example, the user journey data includes data describing one or more of a start point, an end point, time of departure from the start point, time of arrival at the end point, a route, a duration, a direction, etc. associated with a journey taken by a user. In another example, the user journey data includes vehicle arrival-departure time log. Other example user journey data is possible. The vehicle arrival-departure time log and time synchronicity data are described below in more detail with reference to FIG. 2.

The user profile data can be data describing user profiles. For example, user profile data associated with a user includes a user name, an e-mail address, user preferences, hobbies, interests, education experience, working experience, and other demographic data describing the user, etc. Other example user profile data are possible.

In some implementations, the storage device 141 may store any data received from the network 105.

In some implementations, the storage device 141 may store any data necessary for the charging system 191 or the optimization system 199 to provide its functionality.

The non-renewable energy power generation facility 112 may include a conventional facility for generating non-renewable energy. For example, the non-renewable energy power generation facility 112 may generate power by burning fossil fuels or splitting atoms (i.e., atomic energy). The non-renewable energy power generation facility 112 may be coupled to the power grid 114 and this coupling may be operable to allow the non-renewable energy power generation facility 112 to discharge the non-renewable energy it generates to the power grid 114.

The REPG facility 170 may include a power generation facility that generates renewable electricity using one or more of the following renewable energy sources: solar panels; windmills; geothermal; ocean waves; etc.

In some implementations, the REPG facility 170 may be coupled to the charging system 191 and this coupling may be operable to allow the REPG facility 170 to discharge the renewable energy it generates to the charging system 191. For example, the REPG facility 170 may be coupled to one or more of the first power coupling 116 and the second power coupling 118.

Although not depicted in FIG. 1, in some implementations the REPG facility 170 may be coupled to the power grid 114 and this coupling may be operable to allow the REPG facility to discharge the renewable energy it generates to the power grid 114.

The REPG facility 170 may include an event notification receipt system 172. The event notification receipt system 172 may be communicatively coupled to the network 105. The event notification receipt system 172 may include a computer system configured to receive events from the network 105. For example, the REPG facility 170 may receive one or more REOC events or one or more DR events from the network 105. The utility 103 may publish the events to the network 105.

In some implementations, the event notification receipt system 172 may include a server that is communicatively coupled to the network 105. The server may include a hardware server or server software operable by a processor of the event notification receipt system 172.

In some implementations, the event notification receipt system 172 may include a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105.

In some implementations, the event notification receipt system 172 may include computer instructions that, when executed by a processor, cause the processor to perform one or more steps of the method 900 described below with reference to FIG. 9.

In some implementations, the event notification receipt system 172 may take steps to cause the REPG facility to respond to the events received by the event notification receipt system 172. For example, the event notification receipt system 172 receives a REOC event and takes steps to cause the REPG facility to stop providing renewable energy generated by the REPG facility to the power grid 114 and start providing the renewable energy to one or more charging systems 191 via one or more couplings that do not include the power grid 114 (e.g., the first power coupling 116 or the second power coupling 118).

The utility 103 may include an organization that manages, maintains and operates the power grid 114.

In some implementations, the utility 103 may operate the non-renewable energy power generation facility 112 or the REPG facility 170 and distribute the energy produced by one or more of these facilities to consumers via the power grid 114.

In some implementations, the utility 103 may purchase energy from the non-renewable energy power generation facility 112 or the REPG facility 170 and distribute the energy produced by one or more of these facilities to consumers via the power grid 114.

The utility 103 may sell the energy to consumers at rates described by the charge schedule 193. The operators of the utility 103 may create and publish the charge schedule 193 as described above.

The utility 103 may include sensors and software that monitor the supply of electricity on the power grid 114 and consumer demand for the electricity on the power grid 114. In some implementations, the utility 103 may take actions to attempt to achieve and maintain a state of balance (or a state of being substantially balanced) in the supply and demand of power on the power grid 114.

The utility 103 may include an event notification system 111. The event notification system 111 may be communicatively coupled to the network 105. The event notification system 111 may include a computer system configured to take actions to attempt to achieve and maintain a state of balance (or a state of being substantially balanced) in the supply and demand of power on the power grid 114. For example, the event notification system 111 may determine there is too much power on the power grid 114 and issue a REOC event. In another example, the event notification system 111 may determine that there is not enough power on the power grid 114 and issue a DR event. REOC events and DR events may be issued for different reasons as well.

In some implementations, the event notification system 111 may issue the REOC events and the DR events to one or more of the non-renewable energy power generation facility 112, the REPG facility 170 and the charging system 191. The event notification system 111 may issue the REOC events and the DR events via the network 105.

In some implementations, the event notification system 111 may include a server that is communicatively coupled to the network 105. The server may include a hardware server or server software operable by a processor of the event notification receipt system 172.

In some implementations, the event notification system 111 may include a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105.

In some implementations, the event notification system 111 may include computer instructions that, when executed by a processor, cause the processor to perform one or more steps of the method 900 described below with reference to FIG. 9.

In some implementations, the event notification system 111 take actions to attempt to achieve and maintain a state of balance (or a state of being substantially balanced) in the supply and demand of power on the power grid 114. For example, the event notification system 111 may determine there is too much power on the power grid 114 (or too little demand by consumers relative to the available supply of power on the power grid 114) and issue a REOC event. In another example, the event notification system 111 may determine that there is not enough power on the power grid 114 (or too much demand by consumers relative to the available supply of power on the power grid 114) and issue a DR event.

In some implementations, the event notification system 111 may include code and routines for generating events (e.g., REPG events and DR events) and notifying entities of the system 100 about the events. The event notification system 111 sends event data describing REPG events or DR events to one or more of the non-renewable energy power generation facility 112, the REPG facility 170 and the charging system 191. The event data may be transmitted via the network 105.

A REOC event may be an event relating to DR in an electricity grid system. For example, a REOC event may be an event indicating that the REPG facility 170 may not discharge energy it produces to the power grid 114. In some implementations, a REOC event includes one or more DR requirements. For example, a REOC event indicates that the REPG facility 170 shall not discharge energy to the power grid 114 between 1:00 AM and 3:00 AM. In some implementations, a REOC event indicates that the REPG facility 170 may not exceed a threshold amount of electricity released to the power grid 114. Other example requirements are possible.

A DR event may be an event relating to DR in an electricity grid system. For example, a DR event may be an event indicating that the price for electricity is scheduled to increase at a certain time and that the PEV 123 may reduce its consumption of electricity to a specific usage. In some implementations, a DR event includes one or more DR requirements. For example, a DR event indicates the power usage between 6:00 PM and 11:00 PM at a user's home cannot exceed a predetermined amount of electricity. Other example requirements are possible.

The calendar server 151 can be a hardware server that includes a processor, a memory, and network communication capabilities. In the illustrated implementation, the calendar server 151 is coupled to the network 105. The calendar server 151 sends and receives data to and from other entities of the system 100 via the network 105. For example, the calendar server 151 sends data describing a user's calendar to the optimization system 199 upon request and with permission from the user.

The weather server 153 can be a hardware server that includes a processor, a memory, and network communication capabilities. In the illustrated implementation, the weather server 153 is coupled to the network 105. The weather server 153 sends and receives data to and from other entities of the system 100 via the network 105. For example, the weather server 153 sends weather data to the optimization system 199 or the event notification system 111 upon request.

The social network server 155 can be a hardware server that includes a processor, a memory, and network communication capabilities. In the illustrated implementation, the social network server 155 is coupled to the network 105. The social network server 155 sends and receives data to and from other entities of the system 100 via the network 105. The social network server 155 includes a social network application 157. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

It should be understood that the social network server 155 and the social network application 157 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

In some implementations, the social network includes a service that provides a social feed describing one or more social activities of a user. For example, the social feed includes one or more status updates for the user describing the user's actions, expressed thoughts, expressed opinions, etc. In some implementations, the service provided by the social network application 157 can be referred to as a "social network service." Other implementations may be possible.

In some implementations, the charging system 191 may be located within a range of 0.01 centimeters and 100 meters from the PEV 123.

For the purpose of clarity, the PEV 123 may be referred to below as "the PEV 123" or "the vehicle."

Example Vehicle Function System

Figure 2:
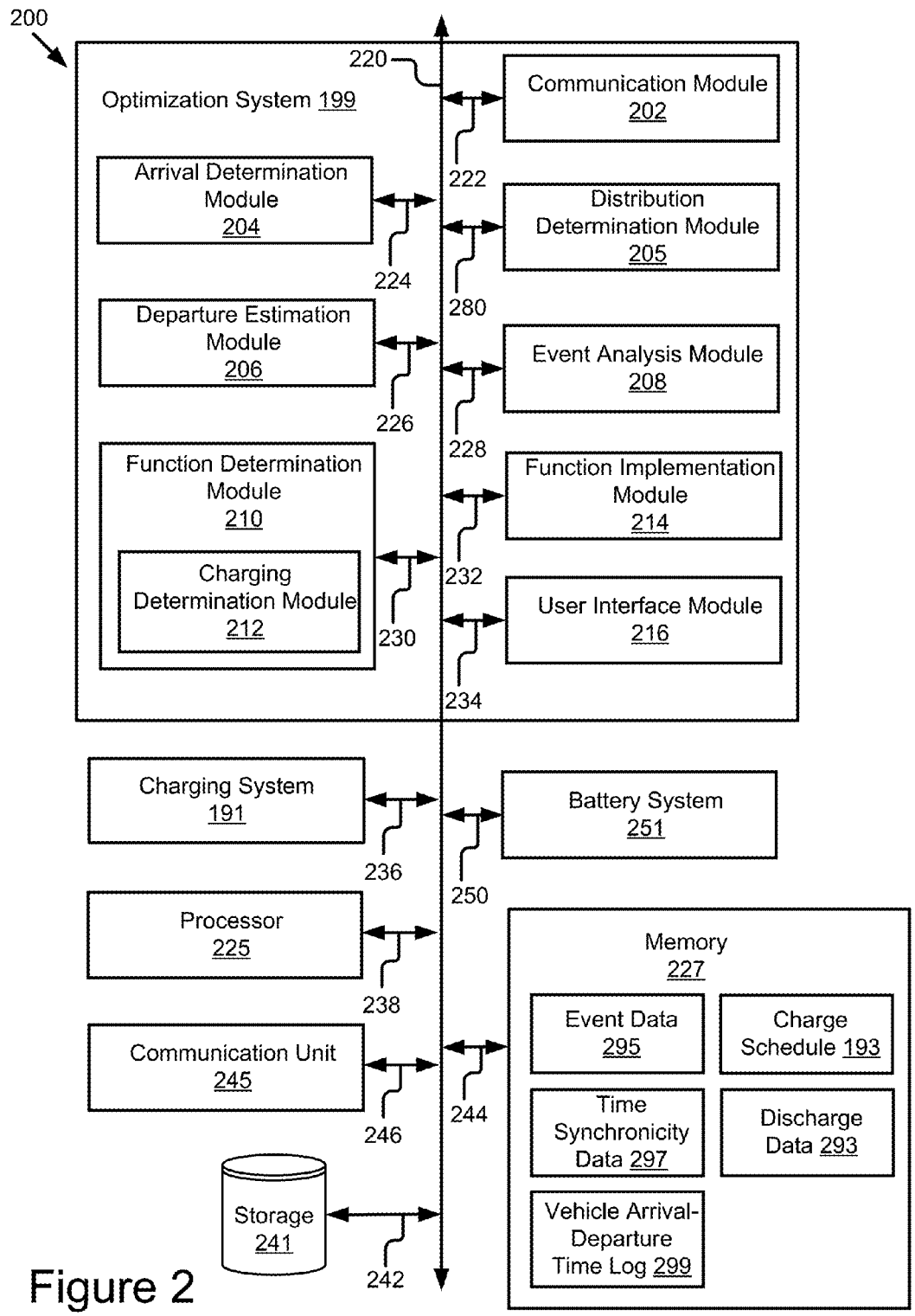
FIG. 2 is a block diagram illustrating an example of a vehicle function system.

Referring now to FIG. 2, an example of the optimization system 199 is shown in more detail. FIG. 2 is a block diagram of a computing device 200 that includes the optimization system 199, the charging system 191, a processor 225, a communication unit 245, a storage 241, a battery system 251, and a memory 227 according to some examples. The components of the computing device 200 are communicatively coupled by a bus 220. In some implementations, the computing device 200 can be one of the PEV 123, the REPG facility 170, the charging system 191 and another server or device that may include the charging system 191.

The charging system 191 was described above with reference to FIG. 1, and so, that description will not be repeated here. In the illustrated implementation, the charging system 191 is communicatively coupled to the bus 220 via signal line 236.

The processor 225 includes an arithmetic logic unit, a microprocessor, a general purpose controller, or some other processor array to perform computations and provide electronic display signals to a display device. The processor 225 is coupled to the bus 220 for communication with the other components via signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. Other processors, operating systems, sensors, displays, and physical configurations may be possible.

The memory 227 stores instructions or data that may be executed by the processor 225. The memory 227 is coupled to the bus 220 for communication with the other components via signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores event data 295, time synchronicity data 297, vehicle arrival-departure time log 299; charge schedule 193 and discharge data 293.

The event data 295 may be data describing one or more of the following: one or more REOC events; and one or more DR events.

The time synchronicity data 297 can be data used to synchronize a time with a universal time. For example, the time synchronicity data 297 can be used to synchronize a vehicle arrival time or a vehicle departure time with a universal time shared among one or more of the following: a fleet of PEVs 123; an event notification system 111; and an event notification receipt system 172.

An arrival time can be data describing when a vehicle arrives at a destination location. For example, an arrival time describes that a vehicle arrived home at 6:00 PM, Oct. 19, 2013. An arrival time can be synchronized with a universal time and referred to as a synchronized arrival time. A departure time can be data describing when a vehicle departs from a location. For example, a departure time describes that a vehicle departed from home at 8:00 AM, Oct. 20, 2013. The departure time can be synchronized with a universal time and referred to as a synchronized departure time. For example, a synchronized arrival time or departure time can be a local time synchronized with the Coordinated Universal Time (UTC) defined by International Telecommunications Union Recommendation (ITU-R TF.460-6) according to the local time zone.

In another example, a synchronized arrival time or departure time can be a time synchronized by timekeeping technologies including GPS satellites and network time protocol (NTP). The network time protocol can be a networking protocol for clock synchronization between computer systems over packet-switched variable-latency data networks.

An association between an arrival time and a departure time describes that a vehicle arrives at a destination location at the arrival time and then departs from the destination location at the departure time. For example, an association between an arrival time and a departure time indicates that a vehicle arrived home at 5:30 PM, Oct. 1, 2013 and then left home in the next morning at 7:00 AM, Oct. 2, 2013. In another example, an association between an arrival time and a departure time indicates that a vehicle arrived home at 12:00 PM, Oct. 1, 2013 and then left home within the next three hours at 2:40 PM, Oct. 1, 2013.

In some implementations, the vehicle arrival-departure time log 299 records one or more of: (1) historical arrival times describing when a vehicle arrived at a location; (2) historical departure times describing when the vehicle departed from the location; and (3) associations between the historical arrival times and the historical departure times.

In some implementations, the historical arrival times and departure times stored in the vehicle arrival-departure time log 299 are synchronized times.

The charge schedule 193 was described above with reference to FIG. 1, and so, that description will not be repeated here.

The discharge data 293 may describe one or more of the following: an amount of electricity discharged to the power grid 114 by the battery system 251; a time or period of time when the electricity was discharged to the power grid 114; whether the time or period of time corresponded with a REOC event or a DR event; and the price of the electricity released to the power grid 114. The price may be expressed as a currency value per watt, kilowatt or some other unit for measuring the electricity discharged to the power grid 114

The communication unit 245 transmits and receives data to and from the network 105 or to another communication channel. The communication unit 245 is coupled to the bus 220 via signal line 246. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, BLU-ETOOTH®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The storage 241 is communicatively coupled to the bus 220 via signal line 242.

In some implementations, the storage 241 provides similar functionality and stores similar data as the storage device 141. In some implementations, the storage 241 stores time synchronicity data 297, user journey data including the vehicle arrival-departure time log 299, user profile data, and other data associated with the user or the PEV 123. In some examples, the storage 241 can be a cloud storage device in a server communicatively coupled to the network 105 and accessible by the optimization system 199. In some other examples, the storage 241 can be a local storage device in the PEV 123.

The battery system 251 can be a system that includes one or more rechargeable batteries. The rechargeable batteries may store electricity generated by one or more of the REPG facility 170 and the non-renewable energy power generation facility 112. The battery system 251 may power the drive train of the PEV 123 using the electricity stored in the one or more batteries.

The battery system 251 may be coupled to one or more of the power grid 114, the first power coupling 116 and the second power coupling 118. This coupling may be operable to enable the battery system 251 to charge the rechargeable batteries with electricity generated by the REPG facility 170 and the non-renewable energy power generation facility 112. This coupling may also be operable to enable the battery system 251 to discharge electricity stored in the rechargeable batteries to the power grid 114.

In some implementations, the battery system 251 may include circuitry or software to respond to instructions received from the optimization system 199. For example, the optimization system 199 may determine that energy stored in the battery system 251 should be discharged to the power grid 114 and the battery system 251 may discharge energy to the power grid 114 based on that decision. In another example, the optimization system 199 may determine that energy should be stored in the battery system 251 during a REOC event and the battery system 251 may charge the battery system 251 based on that decision.

In some implementations, the battery system 251 may determine a state of operation of the one or more rechargeable batteries. For example, the battery system 251 includes code and routines for determining a state of charge for a battery in the PEV 123. A state of charge describes a charge state of a battery. For example, a state of charge indicates a battery is empty or 0% charged. In another example, a state of charge indicates a battery is full or 100% charged. In yet another example, a state of charge indicates a battery is 30% charged. In some implementations, the battery system 251 determines a current state of charge for a battery in a PEV 123. The battery system 251 is communicatively coupled to the bus 220 via signal line 250.

In the illustrated implementation shown in FIG. 2, the optimization system 199 includes a communication module 202, an arrival determination module 204, a distribution determination module 205, a departure estimation module 206, an event analysis module 208, a function determination module 210, a function implementation module 214, and a user interface module 216. These components of the charging system 191 are communicatively coupled to each other via the bus 220. In some implementations, components of the optimization system 199 can be stored in a single server or device. In some other implementations, components of the optimization system 199 can be distributed and stored across multiple servers or devices.

The communication module 202 can be software including routines for handling communications between the optimization system 199 and other components of the computing device 200. In some implementations, the communication module 202 can be a set of instructions executable by the processor 225 to provide the functionality described below for handling communications between the optimization system 199 and other components of the computing device 200. In some implementations, the communication module 202 can be stored in the memory 227 of the computing device 200 and can be accessible and executable by the processor 225. The communication module 202 may be adapted for cooperation and communication with the processor 225 and other components of the computing device 200 via signal line 222.

The communication module 202 sends and receives data, via the communication unit 245, to and from one or more of the event notification system 111, the event notification receipt system 172, the calendar server 151, the weather server 153 and the social network server 155. For example, the communication module 202 receives, via the communication unit 245, calendar data associated with a user from the calendar server 151 and sends the calendar data to the departure estimation module 206. In another example, the communication module 202 receives, via the communication unit 245, event data 295 associated with the utility 103 or the power grid 114. In another example, the communication module 202 receives graphical data for providing a user interface to a user from the user interface module 216 and sends the graphical data to a display of the PEV 123 (e.g., the head unit, the infotainment system, the heads-up display unit), causing the display to present the user interface to the user.

In some implementations, the communication module 202 receives data from components of the optimization system 199 and stores the data in one or more of the storage 241 and the memory 227. For example, the communication module 202 receives data describing an arrival time of the PEV 123 at a destination location from the arrival determination module 204 and stores the data in the vehicle arrival-departure time log 299. In another example, the communication module 202 retrieves user preference data from the storage 241 and sends the user preference data to the function determination module 210.

In some implementations, the communication module 202 may handle communications between components of the optimization system 199. For example, the communication module 202 receives a synchronized arrival time from the arrival determination module 204 and sends the synchronized arrival time to one or more of the departure estimation module 206 and the function determination module 210.

The arrival determination module 204 can be software including routines for determining an arrival time describing when a vehicle arrives at a destination location. The arrival time can be a synchronized arrival time. In some implementations, the arrival determination module 204 can be a set of instructions executable by the processor 225 to provide the functionality described below for determining an arrival time describing when a vehicle arrives at a destination location. In some implementations, the arrival determination module 204 can be stored in the memory 227 of the computing device 200 and can be accessible and executable by the processor 225. The arrival determination module 204 may be adapted for cooperation and communication with the processor 225 and other components of the computing device 200 via signal line 224.

The arrival determination module 204 receives sensor data from one or more sensors of the PEV 123. For example, the arrival determination module 204 receives GPS data indicating that the PEV 123 has arrived at a destination location from a GPS sensor. The sensor data may include location data describing the destination location and a timestamp indicating a time when the vehicle arrived at the destination location. Example destination locations include, but are not limited to, a user's home location, a user's work location, a hotel, a parking lot with charging stations, etc. Other example destination locations are possible.

The arrival determination module 204 determines a synchronized arrival time describing when the PEV 123 arrived at the destination location based in part on the sensor data. For example, the arrival determination module 204 determines a synchronized arrival time of the vehicle based in part on GPS data received from a GPS sensor. In some examples, the synchronized arrival time can be a most recent arrival time of the PEV 123 at the destination location. In some examples, the synchronized arrival time can be a current arrival time of the PEV 123 at the destination location. In some other examples, the synchronized arrival time can be a historical arrival time of the PEV 123 at the destination location.

In some implementations, the arrival determination module 204 sends the synchronized arrival time to one or more of the departure estimation module 206 and the function determination module 210. In some other implementations, the arrival determination module 204 stores the synchronized arrival time in the vehicle arrival-departure time log 299. When the PEV 123 departs from the destination location again, a synchronized departure time can also be stored in the vehicle arrival-departure time log 299 and be associated with the synchronized arrival time.

The distribution determination module 205 can be software including routines for determining distribution patterns describing relationships between arrival times and departure times. In some implementations, the distribution determination module 205 can be a set of instructions executable by the processor 225 to provide the functionality described below for determining distribution patterns describing relationships between arrival times and departure times. In some implementations, the distribution determination module 205 can be stored in the memory 227 of the computing device 200 and can be accessible and executable by the processor 225. The distribution determination module 205 may be adapted for cooperation and communication with the processor 225 and other components of the computing device 200 via signal line 280.

In some implementations, the distribution determination module 205 retrieves (1) historical arrival times each describing when one or more PEVs 123 arrived at a destination location and (2) historical departure times each describing when the one or more PEVs 123 departed from the destination location again from the vehicle arrival-departure time log 299. Using the historical arrival times and the historical departure times, the distribution determination module 205 estimates one or more distribution patterns for the PEV 123 as described below. For example, for each PEV 123 and each destination location, the distribution determination module 205 may determine a first distribution pattern for weekdays, a second distribution pattern for weekends and a third distribution pattern for holidays. A distribution pattern can be data describing a relationship between vehicle arrival times and vehicle departure times at a location for a PEV 123.

A departure time range can be data specifying a time window that a departure time of a vehicle satisfies. For example, a departure time range may describe one of: (1) a PEV 123 departs from a destination location again within a first predetermined time window (e.g., the PEV 123 departs from the destination location again within the next four hours upon arrival at the destination location); (2) the PEV 123 departs from the destination location after a second predetermined time window (e.g., the vehicle departs in the next morning or next one or more days, the PEV 123 departs after 8:00 in the next morning, etc. upon arrival at the destination location); and (3) uncertainty of the vehicle departure time (e.g., the PEV 123 may depart within the next few hours of the same day or in the next morning upon arrival at the destination location), etc.

Each departure time range can be associated with one arrival time range. An arrival time range can be a window including a series of arrival times. When a PEV 123 arrives at a destination location within an arrival time range, a departure time of the PEV 123 departing again from the destination location satisfies a departure time range associated with that arrival time range. For example, when a PEV 123 arrives at a destination location at 11:00 AM within an arrival time range (8:00 AM-12:00 PM), a departure time of the PEV 123 satisfies an associated departure time range describing that the PEV 123 will depart from the destination location within three hours.

In some implementations, the distribution pattern includes data describing associations between the arrival time ranges and the departure time ranges. For example, a distribution pattern describes that: (1) when a PEV 123 arrives at a destination location within a first arrival time range (e.g., 0:00 AM-8:00 AM), the PEV 123 will depart from the destination location again within a first predetermined time window (e.g., the vehicle will depart within the next four hours upon arrival); (2) when the PEV 123 arrives at the destination location within a second arrival time range (e.g., 8:00 AM-4:00 PM), it is uncertain when the PEV 123 will depart from the destination location again (e.g., it is uncertain whether the PEV 123 may depart within the next several hours or in the next morning); and (3) when the PEV 123 arrives at the destination location within a third arrival time range (e.g., 4:00 PM-0:00 AM), the PEV 123 will depart from the destination location after a second predetermined time window (e.g., the PEV 123 will stay overnight at the destination location and depart after 7:30 AM in the next morning), etc.

Different users may be associated with different distribution patterns. For example, a first distribution pattern associated with a first user indicates when the first user's PEV 123 arrives home between 4:00 PM and 6:00 PM, the first user's PEV 123 will leave home again within the next three hours after arrival. A second distribution pattern associated with a second user indicates when the second user's PEV 123 arrives home after 4:00 PM, the second user's PEV 123 will not leave home until 7:00 AM in the next morning. A third distribution pattern associated with a third user indicates when the third user's PEV 123 arrives home after 21:00, the third user's PEV 123 will not leave home until 8:00 AM in the next morning.

In some implementations, the distribution determination module 205 establishes a two dimensional (2D) coordinate system with a first coordinate (e.g., the x coordinate) representing the arrival time and a second coordinate (e.g., the y coordinate) representing the departure time. The distribution determination module 205 organizes historical arrival times and historical departure times associated with the PEV 123 and the destination location into time pairs, where each time pair includes a historical arrival time and an associated historical departure time. For example, a time pair (T1, T2) indicates the PEV 123 arrived at the destination location at the arrival time T1 and then departed from the destination location at the departure time T2. The distribution determination module 205 creates a distribution graphic by plotting all the time pairs as points in the 2D coordinate system. A distribution graphic can be a graphic illustrating how the time pairs are distributed in the 2D coordinate system. An example distribution graphic is illustrated with reference to FIG. 8B.

The distribution determination module 205 determines the distribution pattern for the PEV 123 by analyzing distribution of the time pairs in the 2D coordinate system. For example, the distribution determination module 205 determines different arrival time ranges that correspond to different departure time ranges from the distribution graphic, and generates a distribution pattern describing associations between the arrival time ranges and the departure time ranges. The distribution graphic can be a visual representation of the distribution pattern.

For example, referring to FIG. 8B, the distribution determination module 205 plots various time pairs of arrival times and departure times associated with weekdays, weekends, or holidays as points in the 2D coordinate system. For example, a point 844 indicates that the PEV 123 arrived at the destination location at 10:00 and then departed from the destination location at 13:00 of the same day. A point 846 indicates that the PEV 123 arrived at the destination location at 20:00 and then departed from the destination location at 6:00 of the next morning. The distribution determination module 205 determines: (1) a first arrival time range 842a that corresponds to a first departure time range describing that the PEV 123 will depart from the destination location within a first predetermined time window after arrival (e.g., the PEV 123 will depart within the next several hours); (2) a second arrival time range 842*b* that corresponds to a second departure time range indicating uncertainty of the departure time (e.g., the PEV 123 may depart within the next several hours in the same day or will not depart until the next morning); and (3) a third arrival time range 842*c* that corresponds to a third departure time range describing that the PEV 123 will depart from the destination location after a second predetermined time window (e.g., the PEV 123 will depart in the next morning). The distribution determination module 205 generates a distribution pattern describing associations between the arrival time ranges 842*a*, 842*b*, 842*c* and the departure time ranges.

In some implementations, a distribution pattern includes data describing a probability density distribution of the arrival time and the departure time. For example, a distribution pattern describes a joint probability density distribution of the arrival time and the departure time. In another example, a distribution pattern describes a conditional probability of the departure time based on the arrival time. In some examples, the probability density distribution can be organized in a tabular format and referred to as a probability density distribution table. An example probability density distribution table is illustrated with reference to FIG. 8C. In some other examples, the probability density distribution can be stored using a matrix, a look up table or some other data structure.

In some implementations, the distribution determination module 205 applies various estimation mechanisms to create a distribution pattern (e.g., a probability density distribution table) based in part on the historical arrival times and historical departure times. Example estimation mechanisms include, but are not limited to, a Gaussian kernel density estimation (KDE) method and other kernel density estimation (KDE) methods, etc. For each vehicle, the distribution determination module 205 can create one or more probability density distribution tables associated with a destination location. For example, for each PEV 123 and each destination location, the distribution determination module 205 creates a first probability density distribution table for weekdays, a second probability density distribution table for weekends, and a third probability density distribution table for holidays.

In some implementations, the distribution determination module 205 sends data describing a distribution pattern to one or more of the departure estimation module 206 and the function determination module 210. In some implementations, the distribution determination module 205 stores the distribution pattern in the storage 241.

The departure estimation module 206 can be software including routines for estimating departure time data. In some implementations, the departure estimation module 206 can be a set of instructions executable by the processor 225 to provide the functionality described below for estimating departure time data. In some implementations, the departure estimation module 206 can be stored in the memory 227 of the computing device 200 and can be accessible and executable by the processor 225. The departure estimation module 206 may be adapted for cooperation and communication with the processor 225 and other components of the computing device 200 via signal line 226.

The departure estimation module 206 receives data describing a synchronized arrival time describing when a PEV 123 arrived at a destination location from the arrival determination module 204. The departure estimation module 206 determines an arrival day associated with the synchronized arrival time. For example, the departure estimation module 206 determines whether the arrival day is a weekday, a weekend, or a holiday. The departure estimation module 206 receives data describing the PEV's 123 distribution pattern associated with the arrival day and the destination location from the distribution determination module 205 or the storage 241. The departure estimation module 206 estimates departure time data for the PEV 123 based in part on the synchronized arrival time and the distribution pattern as described below.

In some implementations, the departure time data includes an estimated departure time describing when the PEV 123 departs from the destination location. The departure estimation module 206 estimates the departure time for the PEV 123 based in part on the synchronized arrival time and the distribution pattern. For example, the departure estimation module 206 determines possible departure times associated with the synchronized arrival time based in part on the distribution pattern. The departure estimation module 206 estimates the departure time as a frequent departure time among all the possible departure times. For example, the estimated departure time can be the most frequent departure time among all the possible departure times based on the synchronized arrival time.

In another example, assume the distribution pattern includes a probability density distribution table. Given that the arrival time is equal to the synchronized arrival time, the departure estimation module 206 determines a conditional probability of the departure time based on the probability density distribution table. For example, the departure estimation module 206 uses Bayesian estimation methods to determine the conditional probability of the departure time given the synchronized arrival time. The departure estimation module 206 estimates the departure time as a departure time value having the highest conditional probability value given the synchronized arrival time.

In some other implementations, the departure time data includes data describing an estimated departure time range associated with the synchronized arrival time. A departure time of the PEV 123 satisfies the estimated departure time range. The departure estimation module 406 estimates the departure time range associated with the synchronized arrival time based in part on the distribution pattern. For example, the departure estimation module 206 determines a first arrival time range associated with the synchronized arrival time from the distribution pattern, and determines a first departure time range associated with the first arrival time range based in part on the distribution pattern. The departure estimation module 206 estimates the departure time range for the PEV 123 as the first departure time range associated with the first arrival time range.

In a further example, assume the synchronized arrival time is 9:00. A distribution pattern indicates that when a PEV 123 arrives at a destination location within an arrival time range 8:00-14:00, the PEV 123 will depart from the destination location within 4-6 hours upon arrival. Since the synchronized arrival time 9:00 falls within the arrival time range 8:00-14:00, the departure estimation module 206 estimates a departure time range for the PEV 123 that describes the PEV 123 will depart from the destination location within 4-6 hours upon arrival.

In another example, assume the synchronized arrival time is 15:00. A distribution pattern indicates that when a PEV 123 arrives at a destination location within an arrival time range 14:00-20:00, the PEV 123 sometimes departs from the destination location within 2-3 hours upon arrival and sometimes does not depart from the destination location until 6:00 in the next morning. Since the synchronized arrival time 15:00 falls within the arrival time range 14:00-20:00, the departure estimation module 206 estimates a departure time range for the PEV 123 that describes the departure time for the PEV 123 is uncertain. For example, the estimated departure time range indicates that the PEV 123 may depart from the destination location within 2-3 hours upon arrival or may not depart from the destination location until 6:00 in the next morning.

In yet another example, assume the synchronized arrival time is 21:30. A distribution pattern associated with a PEV 123 indicates that when the PEV 123 arrives at a destination location within an arrival time range 21:00-24:00, the PEV 123 will depart from the destination location after 7:00 in the next morning. Since the synchronized arrival time 21:30 falls within the arrival time range 21:00-24:00, the departure estimation module 206 estimates a departure time range for the PEV 123 that describes the PEV 123 will depart from the destination location after 7:00 in next morning.

In some implementations, the estimated departure time range indicates that the PEV 123 will depart from the destination location after a predetermined time window (e.g., the PEV 123 will depart after 7:00 AM in the next morning). The departure estimation module 206 estimates a departure time for the PEV 123 that satisfies the departure time range based in part on the distribution pattern. For example, the departure estimation module 206 estimates a departure time as one of: (1) a most frequent departure time satisfying the departure time range; and (2) an earliest departure time satisfying the departure time range. In a further example, assume the departure time range indicates the PEV 123 will depart after 7:00 AM in the next morning. The distribution pattern indicates the PEV 123 usually departs at 8:00 AM and occasionally departs at 7:00 AM or 9:00 AM. The departure estimation module 206 can estimate the departure time for the PEV 123 as the frequent departure time 8:00 AM or the earliest departure time 7:00 AM satisfying the departure time range.

In some implementations, the departure estimation module 206 receives weather data from the weather server 153, calendar data from the calendar server 151, and user profile data from the social network server 155. The departure estimation module 206 determines the departure time data further based in part on one or more of the weather data, the calendar data, and the user profile data. For example, assume the weather data indicates a snowstorm is coming in one hour and will last until midnight. The calendar data indicates the user does not have events or appointments for the rest of the day. The departure estimation module 206 determines that the user may stay home for the rest of the day and estimates a departure time range for the user's PEV 123 describing that the PEV 123 may depart from home in the next morning based in part on the weather data and the calendar data.

In some implementations, the departure estimation module 206 sends the departure time data describing the estimated departure time range or the estimated departure time to the function determination module 210. In some implementations, the departure estimation module 206 stores the departure time data in the storage 241.

The event analysis module 208 can be software including routines for analyzing events such as REOC events and DR events. In some implementations, the event analysis module 208 can be a set of instructions executable by the processor 225 to provide the functionality described below for analyzing events. In some implementations, the event analysis module 208 can be stored in the memory 227 of the computing device 200 and can be accessible and executable by the processor 225. The event analysis module 208 may be adapted for cooperation and communication with the processor 225 and other components of the computing device 200 via signal line 228.

The event analysis module 208 receives event data 295 describing one or more events from the event notification system 111. The event analysis module 208 analyzes the event data 295 to the type of event and any requirements for the event. For example, the event analysis module 208 analyzes the event data 295 to determine that a REOC event has been issued and that the REPG facility 170 cannot discharge electricity to the power grid 114 for a period of time specified by the event data 295 for the REOC event. In another example, the event analysis module 208 analyzes the event data 295 to determine the presence of a DR event that requires that power usage at a destination location (e.g., the residence of the PEV 123) cannot exceed a certain amount of electricity between 20:00 and 24:00. In another example, the event analysis module 208 analyzes the event data 295 to determine that power usage at a destination location needs to be minimized before midnight. Other example events and event requirements are possible.

The prices included in the charge schedule 193 may be dynamic and updated at regular intervals by the utility 103 via the network 105. These updates may occur every five minutes, every 15 minutes, every 30 minutes, every hour, every few hours, every day or some other time interval. The changes to the charge schedule may indicate new prices for electricity available via the power grid 114.

In some implementations, an event may include a change in the price of electricity available on the power grid 114. For example, the price may be higher or lower relative to an earlier time or the historical price for electricity. For example, with reference to FIG. 11, element 1110 is an example of a time when the cost for electricity is lower than an earlier time that coincided with a DR event 1120. Other examples are possible. If the price is higher relative to an earlier time, the requirement for the event may include discharging an amount of electricity to the power grid 114 in exchange for a fee so long as doing so will not prevent the PEV 123 from having sufficient charge for its next journey. If the price is lower relative to an earlier time, then the requirement may include charging the battery system 251 or charging the battery system 251 at a higher rate than the current rate of charge.

In some implementations, an event may include the battery system 251 discharging electricity to the power grid 114. The requirements for this event may include recording and storing discharge data 293 describing the event.

The event analysis module 208 sends data to the function determination module 210 that describes the type of event and the requirement for the event. In some implementations, the event analysis module 208 stores the event data 295 and the decision data in the memory 227 or the storage 241.

The function determination module 210 can be software including routines for determining one or more vehicle functions for a PEV 123. In some implementations, the function determination module 210 can be a set of instructions executable by the processor 225 to provide the functionality described below for determining one or more vehicle functions for a PEV 123. In some implementations, the function determination module 210 can be stored in the memory 227 of the computing device 200 and can be accessible and executable by the processor 225. The function determination module 210 may be adapted for cooperation and communication with the processor 225 and other components of the computing device 200 via signal line 230.

In some implementations, the vehicle function may include responding to one or more of the following: a REOC event; a DR event; an increase in the price of electricity available on the power grid 114; a decrease in the price of electricity available on the power grid 114; a discharge of electricity from a battery system of the PEV 123 to the power grid 114.

For example, responsive to an REOC event, the vehicle function may include storing power in the battery system 251 of the PEV 123 during the time period of the REOC event.

In another example, responsive to a DR event, the vehicle function may include the battery system 251 of the PEV 123 discharging power to the power grid 114 during the time period of the DR event so long as doing so will not prevent the PEV 123 from having sufficient power for its next journey as estimated by the departure estimation module 206.

In yet another example, responsive to the battery system of the PEV 123 discharging power to the power grid 114, the vehicle function may include determining a price of the power released to the power grid 114 based on the charge schedule 193 and requesting a fee from the utility 103 for the price of the power discharged to the power grid 114.

In some implementations, an event may include a change in the price of electricity available on the power grid 114. For example, if the price of electricity is lower relative to an earlier time, the vehicle function may include charging the battery system 251 of the PEV 123 via the power grid 114. In another example, if the price of the electricity is higher relative to an earlier time, the vehicle function may include discharging electricity stored in the battery system 251 of the PEV 123, in exchange for a payment from the utility 103 corresponding to the higher price of electricity indicated by the charge schedule 193, so long as doing so will not prevent the PEV 123 from having sufficient power for its next journey as estimated by the departure estimation module 206.

In some implementations, the function determination module 210 may receive a synchronized arrival time from the arrival determination module 204. The function determination module 210 may determine one or more vehicle functions to be performed at the destination location based in part on the synchronized arrival time. For example, the function determination module 210 instructs the departure estimation module 206 to estimate departure time data based in part on the synchronized arrival time and receives the departure time data from the departure estimation module 206. The function determination module 210 determines one or more functions based in part on the departure time data. For example, assume the departure time data includes an estimated departure time. The function determination module 210 determines to perform temperature control in the PEV 123 and to transfer data between the PEV 123 and a server before the estimated departure time. The vehicle determination module 210 generates a notification describing the one or more vehicle functions to be performed and sends the notification to the user interface module 216 for presentation to a user.

In some implementations, the departure time data may include an estimated departure time range. If the estimated departure time range indicates uncertainty of vehicle departure time from the destination location, the function determination module 210 may determine to perform one or more vehicle functions immediately in order to minimize failure of the performance of the one or more vehicle functions due to time shortage. For example, if the departure time of the PEV 123 is uncertain (e.g., the vehicle may depart within the next several hours or may depart in the next morning), the function determination module 210 determines to charge the PEV 123 immediately in case that the PEV 123 may depart within the next several hours. The function determination module 210 sends an immediate decision signal to the function implementation module 214 for performing the one or more vehicle functions immediately. In some examples, a user can decide whether to perform the one or more vehicle functions immediately or not. For example, a user can instruct the function determination module 210 to delay the performance of the one or more vehicle functions by setting a charging preference for the PEV 123.

In some implementations, if the estimated departure time range indicates the PEV 123 will depart within a first predetermined time window, the function determination module 210 may determine to perform one or more vehicle functions immediately. For example, if the estimated departure time range indicates the PEV 123 will depart within the next three hours, the function determination module 210 determines to charge the PEV 123 immediately. The function determination module 210 sends an immediate decision signal to the function implementation module 214 for performing the one or more vehicle functions immediately.

In some implementations, if the estimated departure time range indicates the PEV 123 will depart after a second predetermined time window, the function determination module 210 may instruct the departure estimation module 206 to estimate a departure time for the PEV 123 that satisfies the departure time range. For example, if the PEV 123 will depart after 7:00 AM in the next morning, the function determination module 210 instructs the departure estimation module 206 to determine a departure time for the PEV 123, where the departure time can be a frequent departure time 8:15 AM describing when the PEV 123 frequently departs from the destination location or an earliest departure time 7:00 AM satisfying the departure time range.

In some implementations, the function determination module 210 may determine one or more schemes to perform one or more vehicle functions based in part on the estimated departure time. For example, the function determination module 210 generates a temperature control scheme to start controlling temperature in the vehicle at 10 minutes before the estimated departure time. In another example, the function determination module 210 generates a data scheme to transfer data between the vehicle and a server at 5:00 AM-5:30 AM when network traffic is low before the estimated departure time. In yet another example, the function determination module 210 controls charge of the vehicle based in part on the estimated departure time. The function determination module 210 can include a charging determination module 212 for controlling the charge of the vehicle as described below in more detail.

In some implementations, the function determination module 210 may receive user preference data from the social network server 155 and determines one or more vehicle functions further based in part on the user preference data. For example, if the user preference data indicates a preference to charge the PEV 123 as soon as the PEV 123 arrives at the destination location, the function determination module 210 may instruct the function implementation module 214 to charge the PEV 123 immediately upon arrival of the PEV 123. In another example, if the user preference data indicates a preference to charge the PEV 123 when the power rates satisfy a threshold, the function determination module 210 may instruct the charging determination module 212 to determine charging time slots that have power rates satisfying the threshold for charging the PEV 123.

The charging determination module 212 can be software including routines for controlling charge of a PEV 123. In some implementations, the charging determination module 212 can be a component of the function determination module 210. In some other implementations, the charging determination module 212 can be a component separate from the function determination module 210.

In some implementations, the charging determination module 212 may receive an estimated departure time for a PEV 123 from the function determination module 210 or the departure estimation module 206. The estimated departure time satisfies a departure time range indicating the PEV 123 will depart after a predetermined time window (e.g., the vehicle will depart after 7:00 AM in the next morning). The charging determination module 212 determines a charging completion time based in part on the estimated departure time. For example, the charging determination module 212 determines a charging completion time which is 30 minutes earlier than the estimated departure time. A charging completion time can be a time when a PEV 123 completes charging. In some examples, a charging completion time can be a time before the estimated departure time. In some other examples, a charging completion time can be the same as the estimated departure time.

In some implementations, the charging determination module 212 may receive data describing one or more types of events and one or more requirements associated with those events from the event analysis module 208. The charging determination module 212 may determine available time slots for charging the PEV 123 based in part on the one or more requirements and the charging completion time. For example, the charging determination module 212 determines a set of time slots between a charging connection start time and the charging completion time, determines a subset of time slots that are not available for charging the PEV 123 based in part on the requirements and determines available time slots by excluding the subset of time slots from the set of time slots. A charging connection start time can be a time describing when a charging connection between a PEV 123 and a power source starts to establish.

In some implementations, the charging determination module 212 determines a target state of charge for one or more batteries of the PEV 123 based in part on the user's journey data. For example, if the user's journey data indicates the user usually drives the PEV 123 for no more than three hours a day, the charging determination module 212 may determine a target state of charge for the batteries that can last at least a 3-hour drive of the PEV 123.

The charging determination module 212 retrieves the charge schedule 193 via the network 105. The charging determination module 212 determines one or more charging time slots from the available time slots based in part on one or more of the following: the presence of a REOC event; the presence of a DR event; the price data included in the charge schedule 193; and the target state of charge. For example, the charging determination module 212 arranges the available time slots according to an ascending order of associated power rates. The charging determination module 212 selects one or more charging time slots that have the lowest power rates and also fulfill the target state of charge for the batteries. In a further example, the charging determination module 212 determines that four time slots are needed to charge the batteries from a current state of charge to the target state of charge. Therefore, the charging determination module 212 selects four charging time slots having lowest power rates from the available time slots. If two or more available time slots are associated with the same power rate, the charging determination module 212 may prioritize an earlier time slot over a later time slot for the selection of charging time slots.

In some implementations, the charging determination module 212 may assign the one or more charging time slots to the PEV 123 so that the PEV 123 can be charged at the one or more charging time slots. In some implementations, the charging determination module 212 sends the one or more charging time slots to the function implementation module 214. In some other implementations, the charging determination module 212 stores the one or more charging time slots in the storage 241.

In some implementations, the vehicle function includes discharging power to the power grid 114 and the charging determination module 212 may determine one or more discharging time slots at time periods that correspond to the time period when a DR event is occurring or a time period when a price increase for power on the power grid 114 is occurring.

The function implementation module 214 can be software including routines for implementing one or more vehicle functions. In some implementations, the function implementation module 214 can be a set of instructions executable by the processor 225 to provide the functionality described below for implementing one or more vehicle functions. In some implementations, the function implementation module 214 can be stored in the memory 227 of the computing device 200 and can be accessible and executable by the processor 225. The function implementation module 214 may be adapted for cooperation and communication with the processor 225 and other components of the computing device 200 via signal line 232.

In some implementations, the function implementation module 214 implements one or more vehicle functions immediately responsive to receiving an immediate decision signal from the function determination module 210. In some implementations, the function implementation module 214 implements one or more vehicle functions according to one or more schemes determined by the function determination module 210. For example, the function implementation module 214 starts controlling temperature in the vehicle in 10 minutes before the estimated departure time according to a temperature control scheme determined by the function determination module 210. In another example, the function implementation module 214 transfers data between the PEV 123 and a server at 5:00 AM-5:30 AM when network traffic is low according to a data scheme. In yet another example, the function implementation module 214 charges the PEV 123 according to one or more charging time slots determined by the charging determination module 212. In yet another example, the function implementation module 214 charges the PEV 123 based on the presence of a REOC event or a lower price for electricity relative to an earlier time. In yet another example, the function implementation module 214 discharges some of the power stored in the battery system 251 to the power grid 114 based on the presence of a DR event or a higher price for electricity relative to an earlier time. Other examples are possible.

The user interface module 216 can be software including routines for generating graphical data for providing user interfaces. In some implementations, the user interface module 216 can be a set of instructions executable by the processor 225 to provide the functionality described below for generating graphical data for providing user interfaces. In some implementations, the user interface module 216 can be stored in the memory 227 of the computing device 200 and can be accessible and executable by the processor 225. The user interface module 216 may be adapted for cooperation and communication with the processor 225 and other components of the computing device 200 via signal line 234.

In some implementations, the user interface module 216 generates graphical data for providing a user interface that displays one or more charging time slots to a user. An example user interface for displaying charging time slots is illustrated with reference to FIG. 8A. In some implementations, the user interface module 216 receives a notification describing a vehicle function to be performed for a vehicle from the function determination module 210, and generates graphical data for providing a user interface that depicts the notification. The user interface module 216 sends the graphical data to a client device (e.g., a smartphone, a tablet, etc.), causing the client device to display the user interface to the user. The user interface module 216 may generate graphical data for providing other user interfaces to users.

In some implementations, the user interface may display one or more of the following: an amount of renewable energy stored in the battery system 251; an amount of electricity discharged to the power grid 114; an amount of profit made from discharging electricity to the power grid 114; an amount of benefit provided by storing the renewable energy; and etc.

In some implementations, the optimization system 199 may include code and routines which, when executed by the processor 225, cause the processor 225 to perform one or more of the following steps: estimating a next journey that the PEV 123 will take; estimating a departure time when the next journey will start; estimating a journey power value describing how much wattage the PEV 123 will consume to complete the next journey; determining a PEV 123 power value describing how much wattage the battery system 251 is currently storing; calculating a charge time occurring between an end of the DR event and the departure time; estimating a charge time power value describing how much wattage can be stored in the battery system 251 during the charge time; and determining a maximum discharge value that is a maximum amount of wattage discharged by the battery system 251 of the PEV 123 to the power grid 114 during the DR event so that the battery system 251 is storing the journey power value at the departure time, wherein the maximum discharge value is determined based on one or more of the journey power value, the PEV power value and the charge time power value. The discharging to the power grid 114 may be limited by the optimization system 199 to the maximum discharge value.

In some implementations, determining the maximum discharge value comprises solving for the following equation:

maximum discharge value=charge time power value−journey power value+PEV power value.

In some implementations, battery system 251 of the PEV 123 is coupled to the power grid 114 and the optimization system 199 may include code and routines which, when executed by the processor 225, cause the processor 225 to perform one or more of the following steps: identifying a time period when a cost of power is expensive relative to historical cost based on the charge schedule 193 describing the cost of the power during the time period and the historical cost for power; discharging at least some of the power stored in the battery system 251 of the PEV 123 to the power grid 114 during the time period; monitoring a wattage of power discharged to the power grid 114; determining a cost of the wattage based on the charge schedule 193; storing discharge data 293 describing the wattage discharged by the battery system 251 of the PEV 123 to the power grid 114 during the time period and the cost of the wattage; and providing the discharge data to the utility 103 for reimbursement based on the cost of the wattage.

"V2V" means "vehicle-to-vehicle" in which a first PEV 123 discharges power to a second PEV 123 (not pictured) to charge the 251 battery system of the second PEV 123. "V2G" means "vehicle-to-grid" in which a PEV 123 discharges power the power grid 114. "V2H" indicates "vehicle-to-home" in which a PEV 123 discharges power to a home or residence (not pictured). Accordingly, the vehicle function implemented by the optimization system 199 may include one or more of V2V or V2G or V2H discharging. Although not pictured in FIG. 1 or 2, the charging system 191, optimization system 199 and the PEV 123 may be configured so that the PEV 123 may discharge electricity via one or more of the following modes of operation: V2V; V2G; and V2H. For example, the PEV 123 may be coupled via a power line to the main of a home or residence to discharge electricity to the home or residence. The coupling may include an inverter to invert the electricity from direct current to alternating current and one or more transformers to step up or step down the voltage of the electricity transmitted to the main as needed.

Accordingly, it should be understood that all references herein to a discharge of electricity from the PEV 123 may include either of these modes of operation, e.g., V2V, V2G or V2H.

Methods

Figure 3:
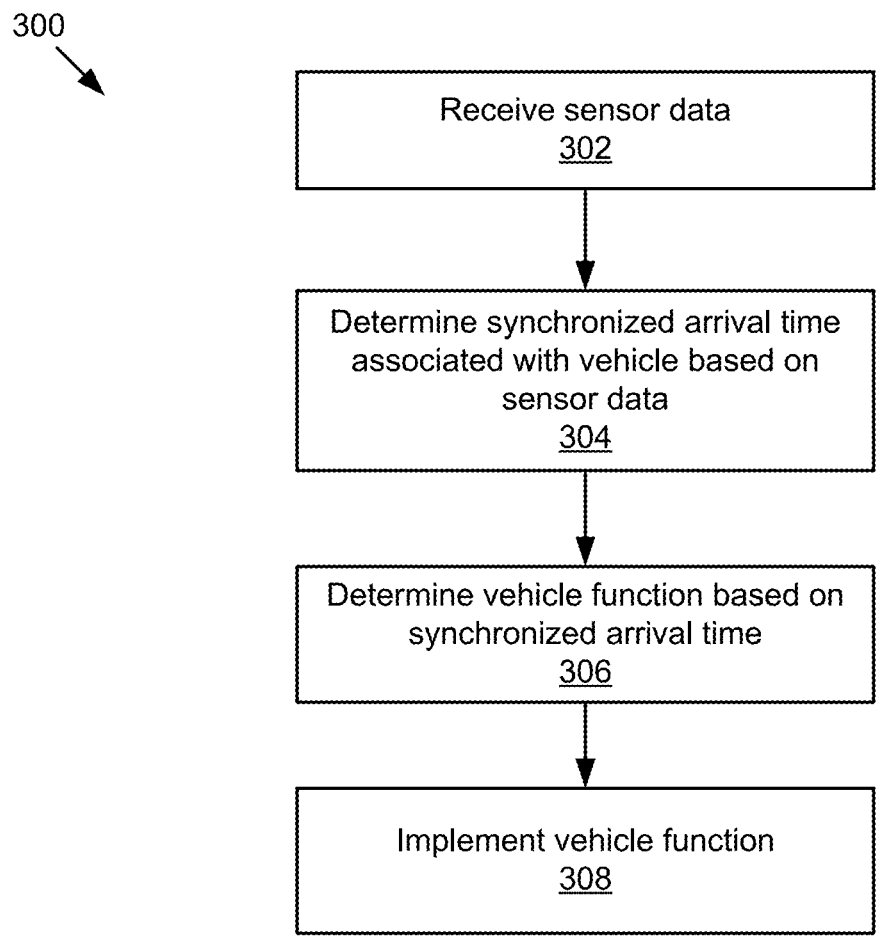
FIG. 3 is a flowchart of an example method for performing one or more vehicle functions.

Referring now to FIG. 3, an example of a method 300 for performing one or more vehicle functions is described. The communication module 202 receives 302 sensor data from one or more sensors of the PEV 123. For example, the communication module 202 receives GPS data from a GPS sensor. The sensor data describes a PEV 123 has arrived at a destination location. The arrival determination module 204 determines 304 a synchronized arrival time describing when the PEV 123 arrived at the destination location based in part on the sensor data. The function determination module 210 determines 306 one or more vehicle functions to be performed at the destination location based in part on the synchronized arrival time. The function implementation module 214 implements 308 the one or more vehicle functions. For example, the charging determination module 212 to determine one or more charging time slots for charging the PEV 123, and the function implementation module 214 charges the PEV 123 according to the one or more charging time slots.

Figure 4:
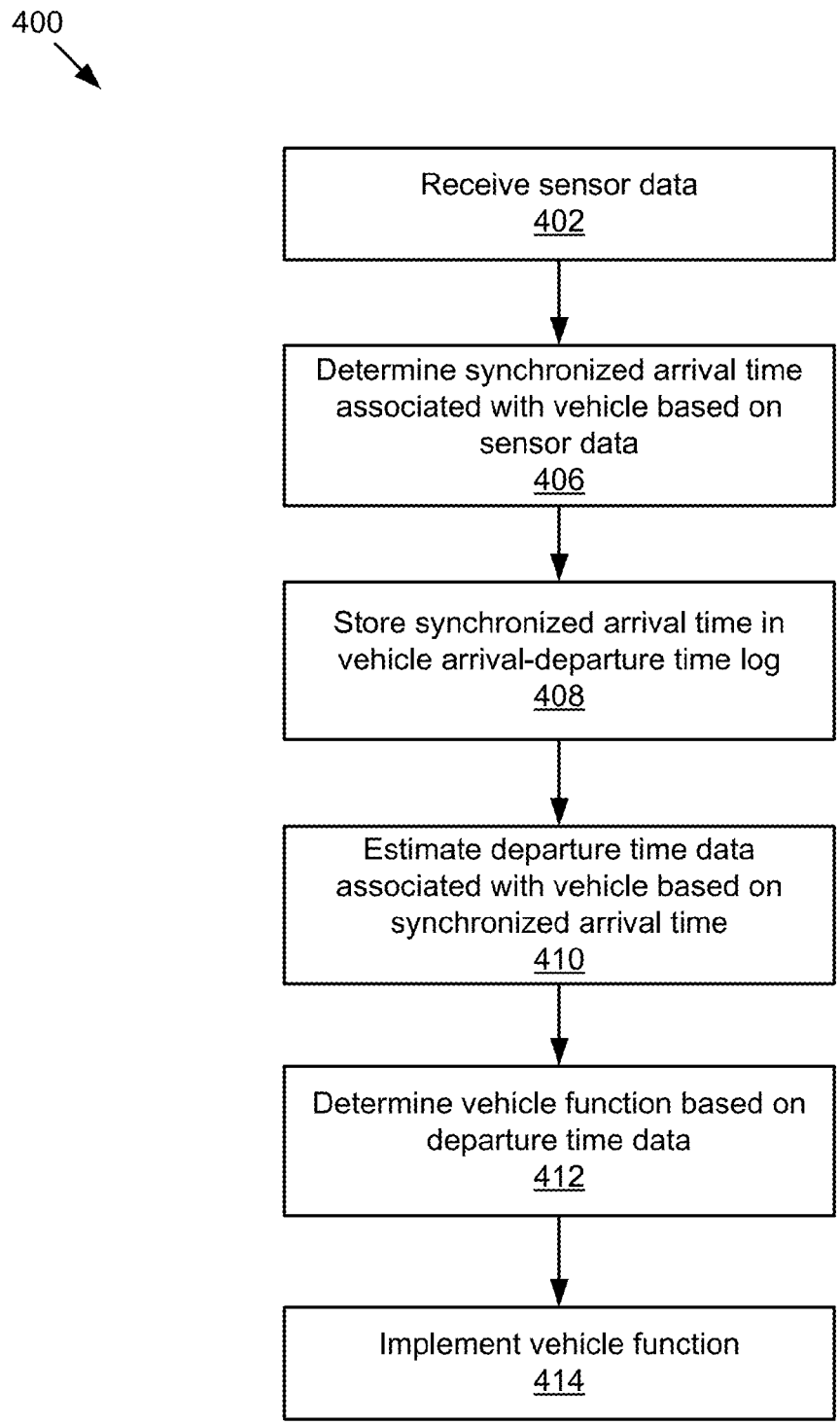
FIG. 4 is a flowchart of another example method for performing one or more vehicle functions.

FIG. 4 is a flowchart of another example method 400 for performing one or more vehicle functions. The communication module 202 receives 402 sensor data from one or more sensors of the PEV 123. The arrival determination module 204 determines 406 a synchronized arrival time describing when a PEV 123 arrived at a destination location based in part on the sensor data. The arrival determination module 204 stores 408 the synchronized arrival time in the vehicle arrival-departure time log 299. The departure estimation module 206 estimates 410 departure time data associated with the PEV 123 based in part on the synchronized arrival time. In some implementations, the departure time data includes an estimated departure time describing when the PEV 123 may depart from the destination location. In some implementations, the departure time data includes a departure time range. An example method 410 for estimating the departure time data is illustrated with reference to FIG. 5.

The function determination module 210 determines 412 one or more vehicle functions associated with the PEV 123 based in part on the departure time data. An example method 412 for determining one or more vehicle functions is illustrated with reference to FIG. 6. The function implementation module 214 implements 414 the one or more vehicle functions.

Figure 5:
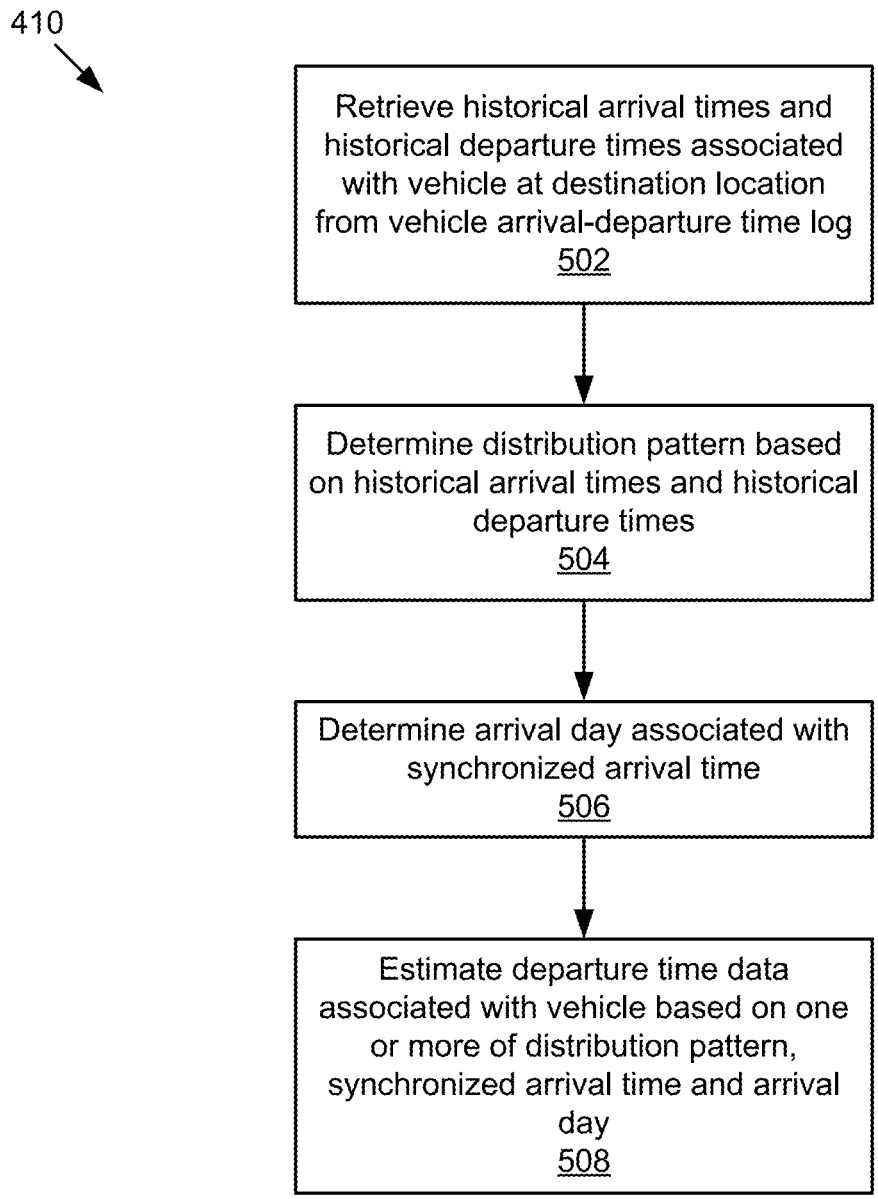
FIG. 5 is a flowchart of an example method for estimating vehicle departure time data.

FIG. 5 is a flowchart of an example method 410 for estimating vehicle departure time data. The communication module 202 retrieves 502 historical arrival times and historical departure times associated with a PEV 123 and a destination location from the vehicle arrival-departure time log 299. The distribution determination module 205 determines 504 a distribution pattern associated with the destination location and the PEV 123 based in part on the historical arrival times and the historical departure times. For example, a distribution pattern includes a probability density distribution table. In another example, a distribution pattern includes data describing associations between arrival time ranges and departure time ranges.

The departure estimation module 206 determines 506 an arrival day associated with a synchronized arrival time. For example, the synchronized arrival time can be a current arrival time or the most recent arrival time. An arrival day can be a weekday, a weekend, or a holiday, etc. The departure estimation module 206 estimates 508 departure time data associated with the PEV 123 based in part on one or more of the distribution pattern, the arrival day, and the synchronized arrival time. For example, the departure estimation module 206 retrieves a distribution pattern associated with the arrival day from the distribution determination module 205 or the storage 241, and determines the departure time data based in part on the distribution pattern and the synchronized arrival time.

Figure 6:
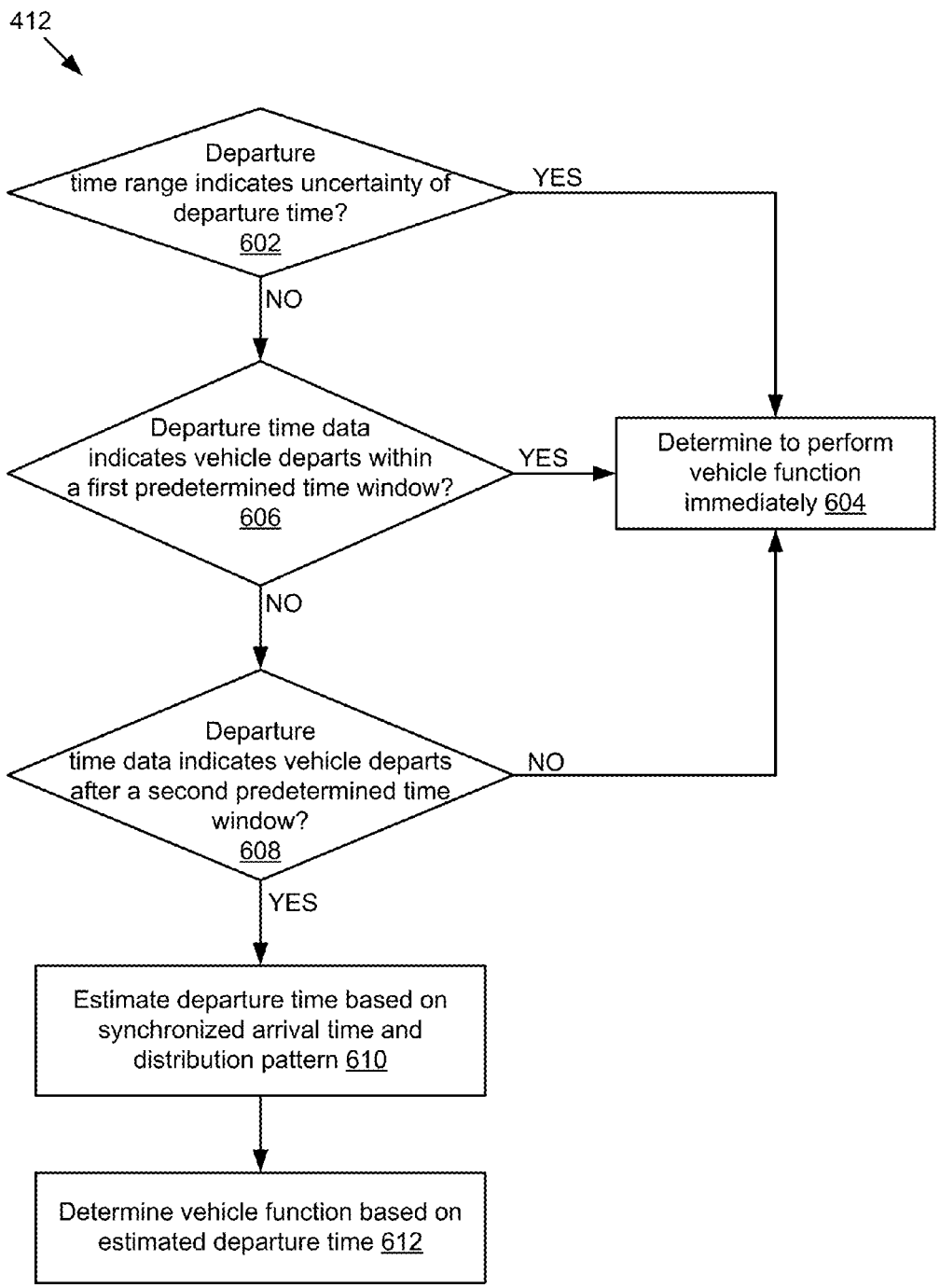
FIG. 6 is a flowchart of an example method for determining one or more vehicle functions.

FIG. 6 is a flowchart of an example method 412 for determining one or more vehicle functions. In some implementations, the departure time data includes a departure time range for a PEV 123. The function determination module 210 determines 602 whether the departure time range indicates uncertainty of a vehicle departure time. For example, the departure time range indicates it is unclear whether the PEV 123 may depart from a destination location in the next few hours or in the next morning. If the departure time range indicates uncertainty of the vehicle departure time, the method 412 moves to block 604. Otherwise, the method 412 moves to block 606. At block 604, the function determination module 210 determines to perform one or more vehicle functions immediately upon arrival of the PEV 123 at the destination location.

At block 606, the function determination module 210 determines whether the departure time range indicates the PEV 123 may depart within a first predetermined time window. For example, the function determination module 210 determines whether the departure time range indicates the PEV 123 will depart in the next four hours. If the departure time range indicates the PEV 123 may depart within the first predetermined time window, the method 412 moves to block 604. Otherwise, the method 412 moves to block 608.

At block 608, the function determination module 210 determines whether the departure time range indicates the PEV 123 may depart after a second predetermined time window. For example, the function determination module 210 determines whether the departure time range indicates the PEV 123 will depart after 7:00 AM in the next morning. If the departure time range indicates the PEV 123 may depart after the second predetermined time window, the method 412 moves to block 610. Otherwise, the method 412 moves to block 604.

At block 610, the departure estimation module 206 estimates a departure time satisfying the departure time range based in part on the synchronized arrival time and the distribution pattern. For example, the estimated departure time can be a most frequent departure time or an earliest departure time satisfying the departure time range. The function determination module 210 determines 612 one or more vehicle functions based in part on the estimated departure time. The one or more vehicle functions can include charging the PEV 123. An example method for controlling charge of the PEV 123 based in part on the estimated departure time is illustrated with reference to FIG. 7.

Figure 7:
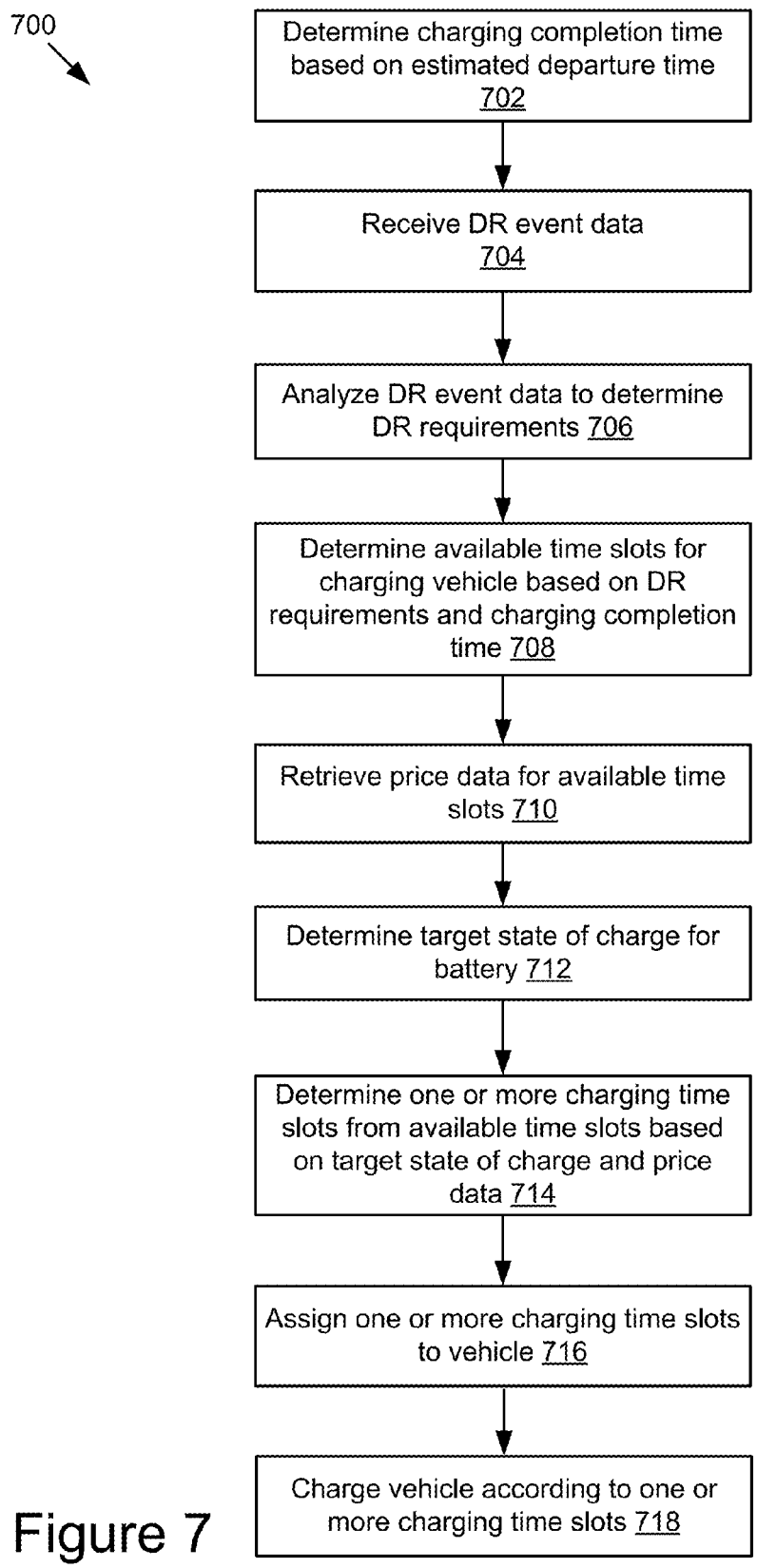
FIG. 7 is a flowchart of an example method for controlling charge of a vehicle.

FIG. 7 is a flowchart of an example method 700 for controlling charge of a PEV 123. The charging determination module 212 determines 702 a charging completion time based in part on an estimated departure time. The charging determination module 212 receives 704 event data 295 from the event notification system 111 or a charge schedule 193 indicating a price change. The charging determination module 212 analyzes 706 one or more of the event data 295 and the charge schedule 193 to determine one or more requirements for the event. The charging determination module 212 determines 708 available time slots for charging the PEV 123 based in part on the one or more requirements and the charging completion time.

The communication module 202 retrieves 710 a most recent charge schedule 193 and event data 295. The charging determination module 212 determines 712 a target state of charge for one or more batteries in the PEV 123. The charging determination module 212 determines 714 one or more charging time slots from the available time slots based in part on (1) the target state of charge, (2) the presence of a REOC event or a DR event and (3) the price data included in the charge schedule 193. The charging determination module 212 assigns 716 the one or more charging time slots to the PEV 123. The function implementation module 214 charges 718 the PEV 123 according to the one or more charging time slots.

Graphic Representations

Figure 8A:
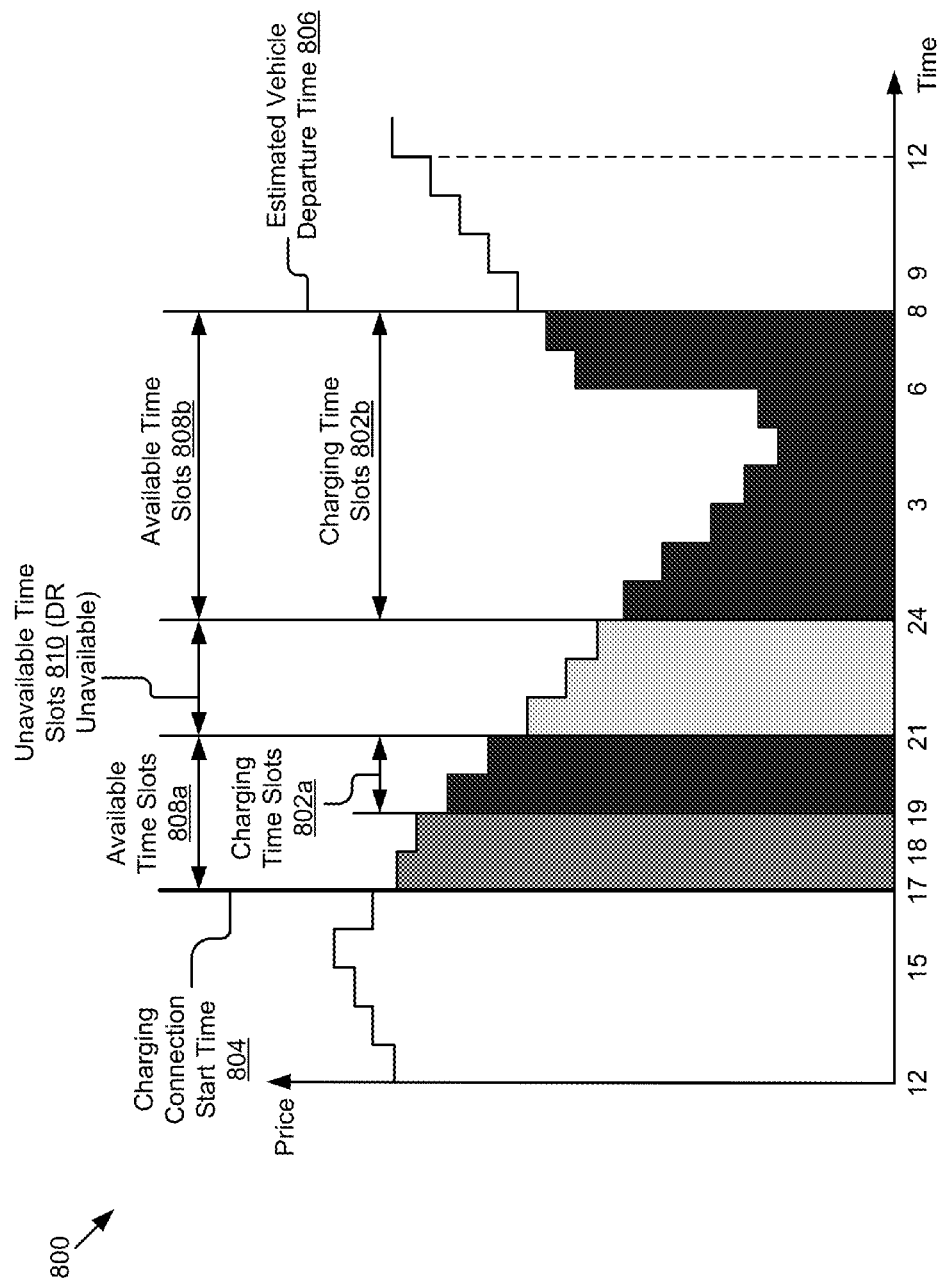
FIG. 8A is a graphic representation illustrating example charging time slots.

FIG. 8A is a graphic representation 800 illustrating example charging time slots 802a, 802b. The graphic representation 800 depicts a charging connection start time 804 (e.g., 17:00) and an estimated vehicle departure time 806 (e.g., 8:00 in the next morning). The charging determination module 212 determines available time slots 808a and 808b and unavailable time slots 810. The time slots 810 are not available for charging the PEV 123 due to DR requirements. The charging determination module 212 determines the charging time slots 802a, 802b that have the lowest prices from the available time slots 808a, 808b.

FIG. 8B is a graphic representation 840 illustrating an example of a distribution graphic. The example distribution graphic illustrates relationship between vehicle arrival times and vehicle departure times. FIG. 8B is described above and the description will not be repeated here.

Figure 8C:
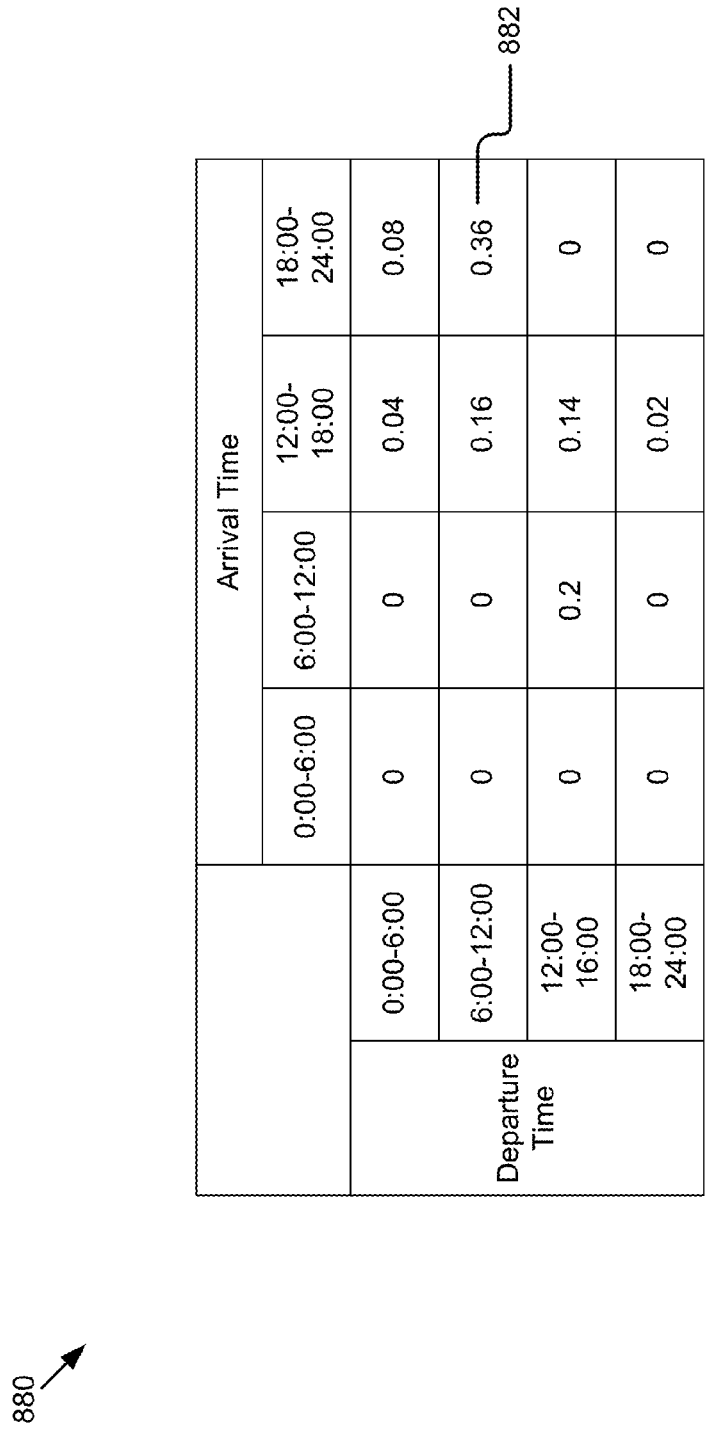
FIG. 8C is a graphic representation illustrating an example probability density distribution table.

FIG. 8C is a graphic representation 880 illustrating an example probability density distribution table. The example probability density distribution table describes a joint probability distribution of the arrival time and the departure time. For example, a value 882 indicates that a joint probability distribution has a value of 0.36 when the arrival time is within 18:00-24:00 and the departure time is within 6:00-12:00 of the next morning.

Figure 9:
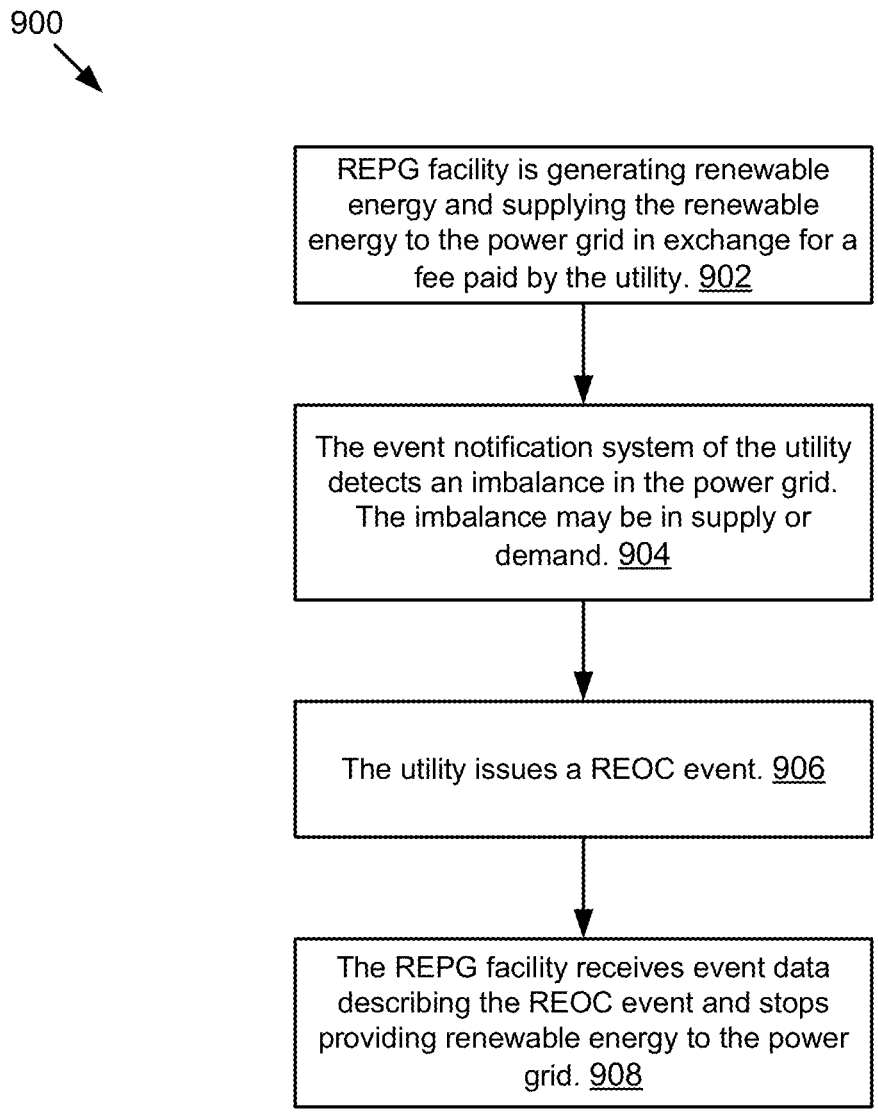
FIG. 9 is a flowchart of an example method for a Renewable Energy Power Generation facility to respond to a Renewable Energy Output Control event.

Referring now to FIG. 9, depicted is a flowchart of an example method 900 for a REPG facility 170 to respond to a REOC event.

At block 902 a REPG facility 170 is generating renewable energy and supplying the renewable energy to the power grid 114 in exchange for a fee paid by the utility 103.

At block 904 the event notification system 111 of the utility 103 detects an imbalance in the power grid 114. The imbalance may be in supply or demand.

At block 906 the utility 103 issues a REOC event.

At block 908 the REPG facility receives event data 295 describing the REOC event and stops providing renewable energy to the power grid 114.

Figure 10A:
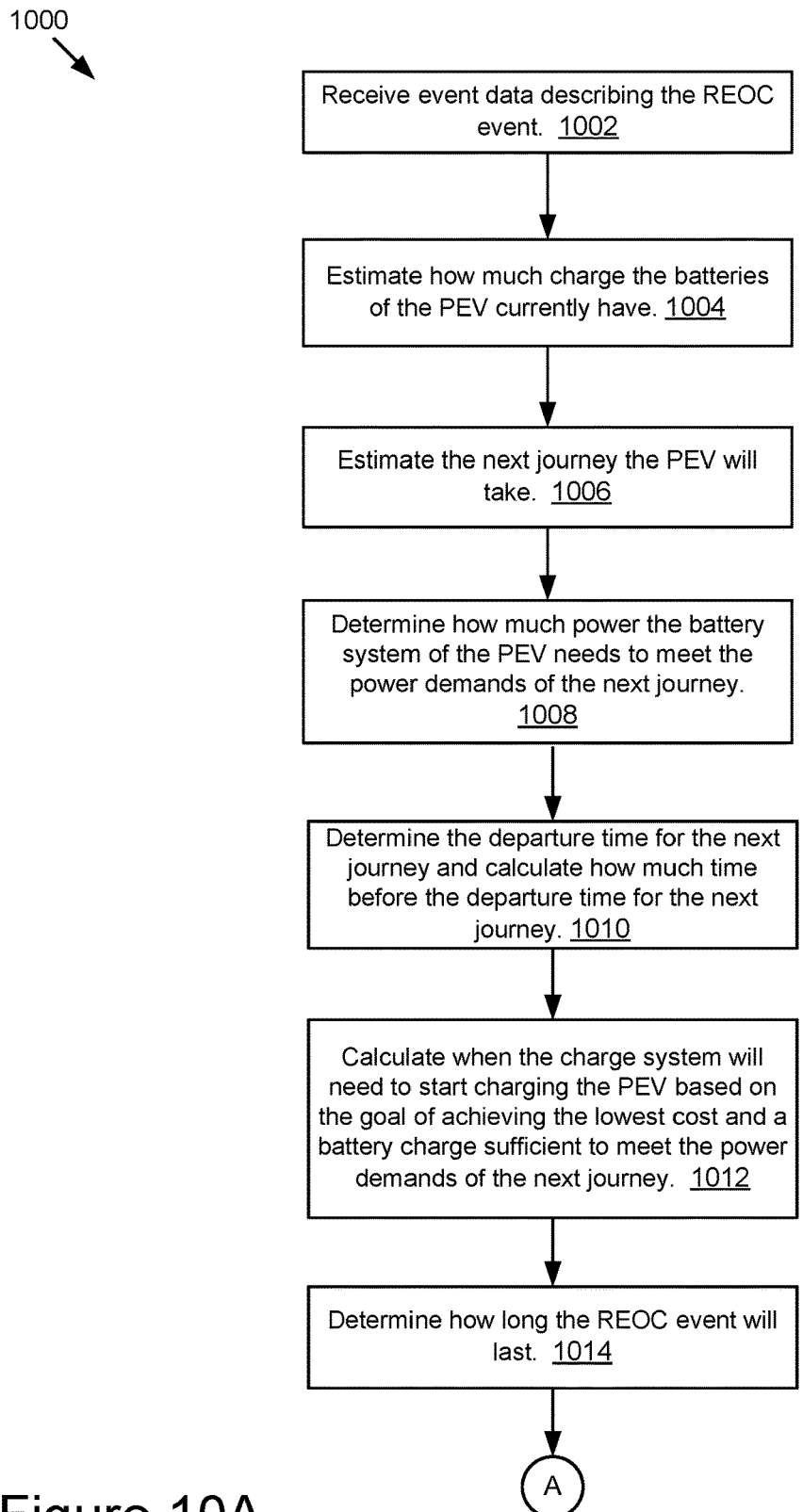
FIGS. 10A, 10B and 10C are a flowchart of an example method for an optimization system to respond to a Renewable Energy Output Control event.
Figure 10B:
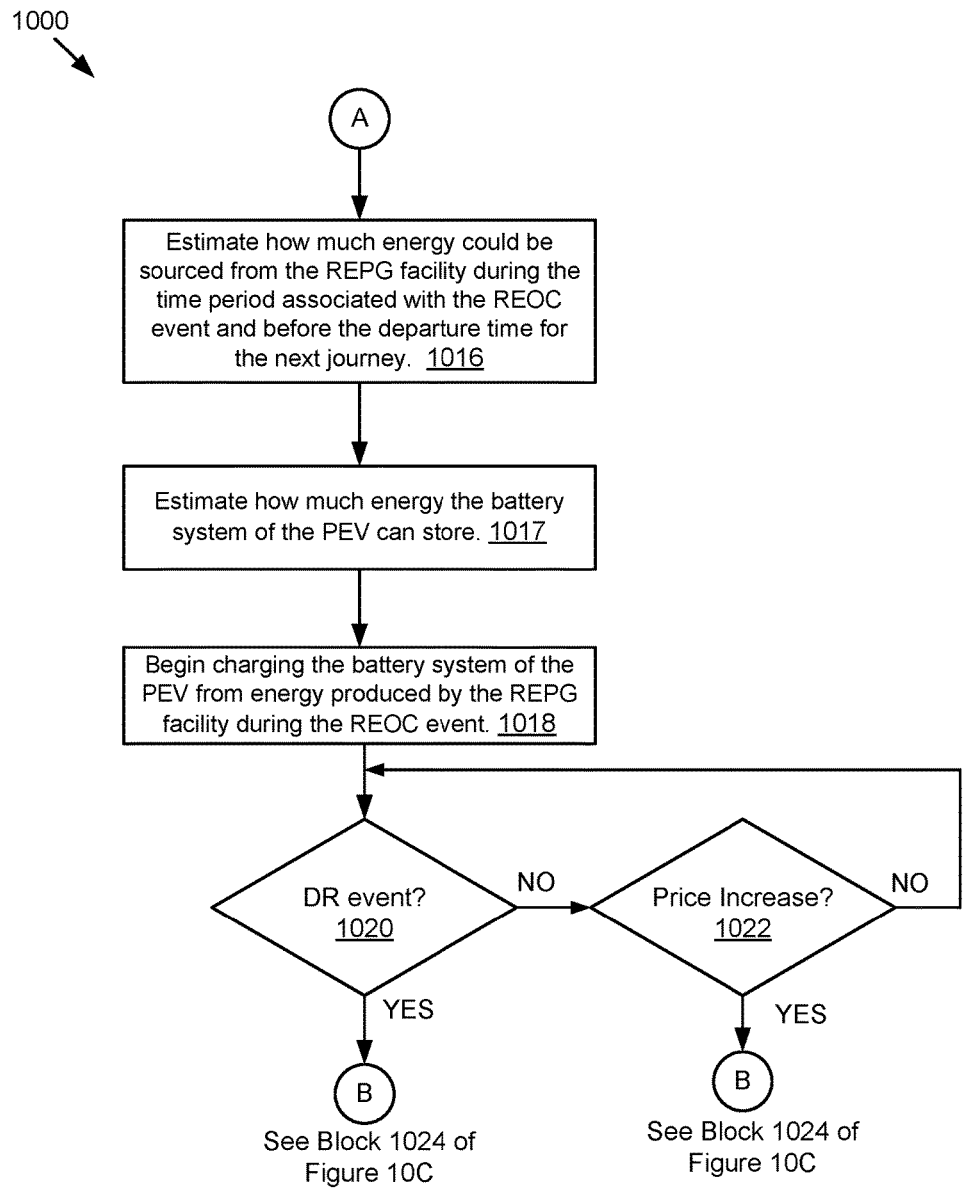
Figure 10C:
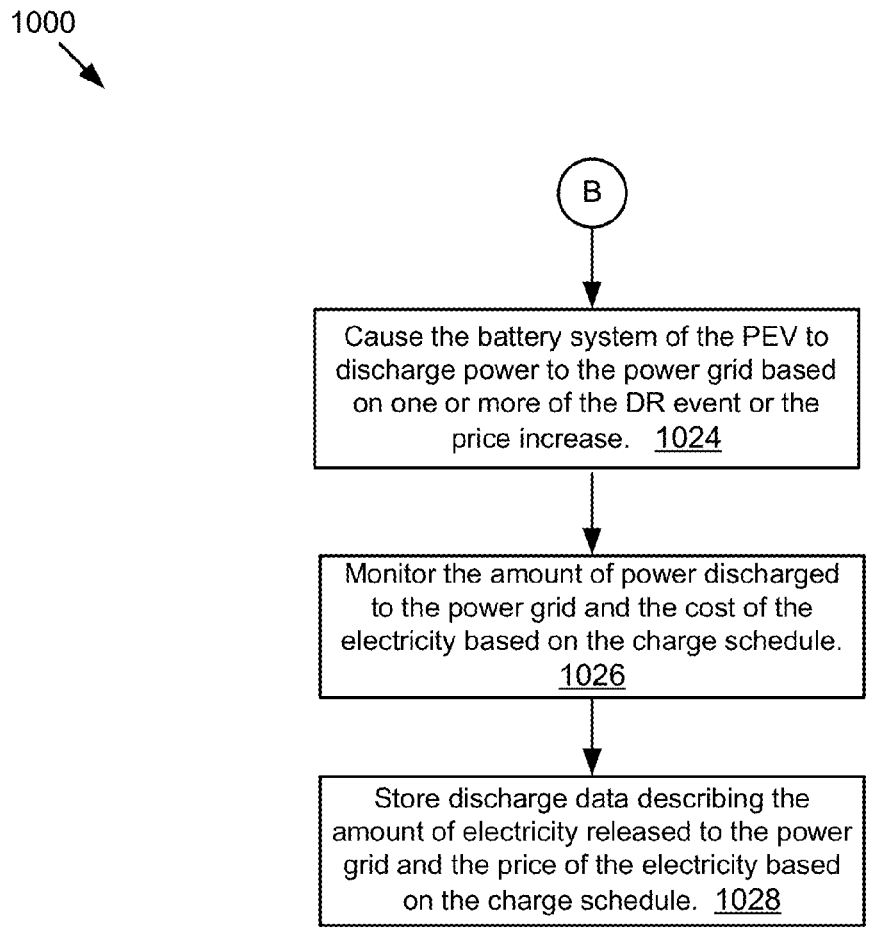

Referring now to FIGS. 10A, 10B and 10C, depicted is a flowchart of an example method 1000 for an optimization system 199 to respond to a REOC event.

Specifically referring to FIG. 10A, at block 1002 the optimization system 199 receives event data 295 describing the REOC event.

At block 1004, the optimization system 199 estimates how much charge the batteries of the PEV 123 currently have.

At block 1006, the optimization system 199 estimates the next journey the PEV 123 will take.

At block 1008, the optimization system 199 determines how much power the battery system 251 of the PEV 123 needs to meet the power demands of the next journey. For example, the battery system 251 needs enough power to complete the next journey without running out of energy to power the PEV 123.

At block 1010, the optimization system 199 determines a departure time for the next journey and calculates a period of time before the departure time for the next journey.

At block 1012, the optimization system 199 calculates when the charging system 191 will need to start charging the PEV based on the goal of achieving the lowest cost and a charge in the battery system 251 that is sufficient to meet the power demands of the next journey.

Referring now to FIG. 10B, at block 1014, the optimization system 199 determines how long the REOC event will last.

At block 1016, the optimization system 199 estimates how much energy could be sourced from the REPG facility 170 during the time period associated with the REOC event and before the next journey. This estimate may exclude time periods when charging functionality may not be available. At block 1017, the optimization system 199 estimates how much energy the battery system 251 of the PEV 123 can store.

At block 1018, the optimization system 199 causes the charging system 191 to begin charging the battery system 251 of the PEV 123 using energy produced by the REPG facility 170 during the time period of the REOC event.

At block 1020 a determination is made by the optimization system 199 regarding whether there has been a DR event while charging the battery system 251 using energy produced by the REPG facility 170 during the time period of the REOC event. This may be determined based on analysis of the event data 295. If a DR event has been published, then the method 1000 proceeds to block 1024 shown in FIG. 10C. If a DR event has not been published, then the method 1000 proceeds to block 1022.

At block 1022 a determination is made by the optimization system 199 regarding whether there has been a price increase for the present time in the cost of electricity available on the power grid 114 while charging the battery system 251 using energy produced by the REPG facility 170 during the time period of the REOC event. This may be determined based on analysis of the charge schedule 193. If a price increase has occurred for the present time, then the method 1000 proceeds to block 1024 shown in FIG. 10C. If a price increase has not occurred for the present time, then the method 1000 proceeds to block 1020.

Referring now to FIG. 10C, at block 1024 the optimization system 199 may cause the battery system 251 of the PEV 123 to discharge power to the power grid 114. The function determination module 210 may determine to initiate this vehicle function based on one or more of the DR event being indicated by the event data 295 (e.g., block 1020) or the price increase being indicated by the charge schedule 193 (e.g., block 1022). The charge schedule 193 may be the most recent charge schedule 193 sourced from the utility 103 via the network 105.

At block 1026, the optimization system 199 may monitor the amount of power discharged by the battery system 251 to the power grid 114. For example, the function implementation module 214 may instruct one or more sensors to monitor and record one or more of the amperage or voltage of the power discharged to the power grid 114. The amperage and the voltage may then be used to calculate power. In another example, the sensors include a power meter that is used to monitor and record the power discharged to the power grid 114. In yet another example, the sensors also include a clock for recording the time period when the power was discharged to the power grid 114. Other examples are possible. With reference to block 1028, the amount of power discharged to the power grid 114 and the time period when the power was discharged to the power grid 114 may be stored as discharge data 293 in the memory 227 or the storage 241.

Also at block 1026, the optimization system 199 may monitor and record the price of the electricity discharged to the power grid 114 by the battery system 251. The function implementation module 214 may include code and routines configured to determine the price based on the amount of power discharged to the power grid 114, the time period when the power was discharged and the price data included in the charge schedule 193 for the time period when the discharging occurred. With reference to block 1028, the processor 225 may execute the function implementation module 214 and record discharge data 293 that describes the price of electricity discharged to the power grid 114 by the battery system 251.

Figure 11:
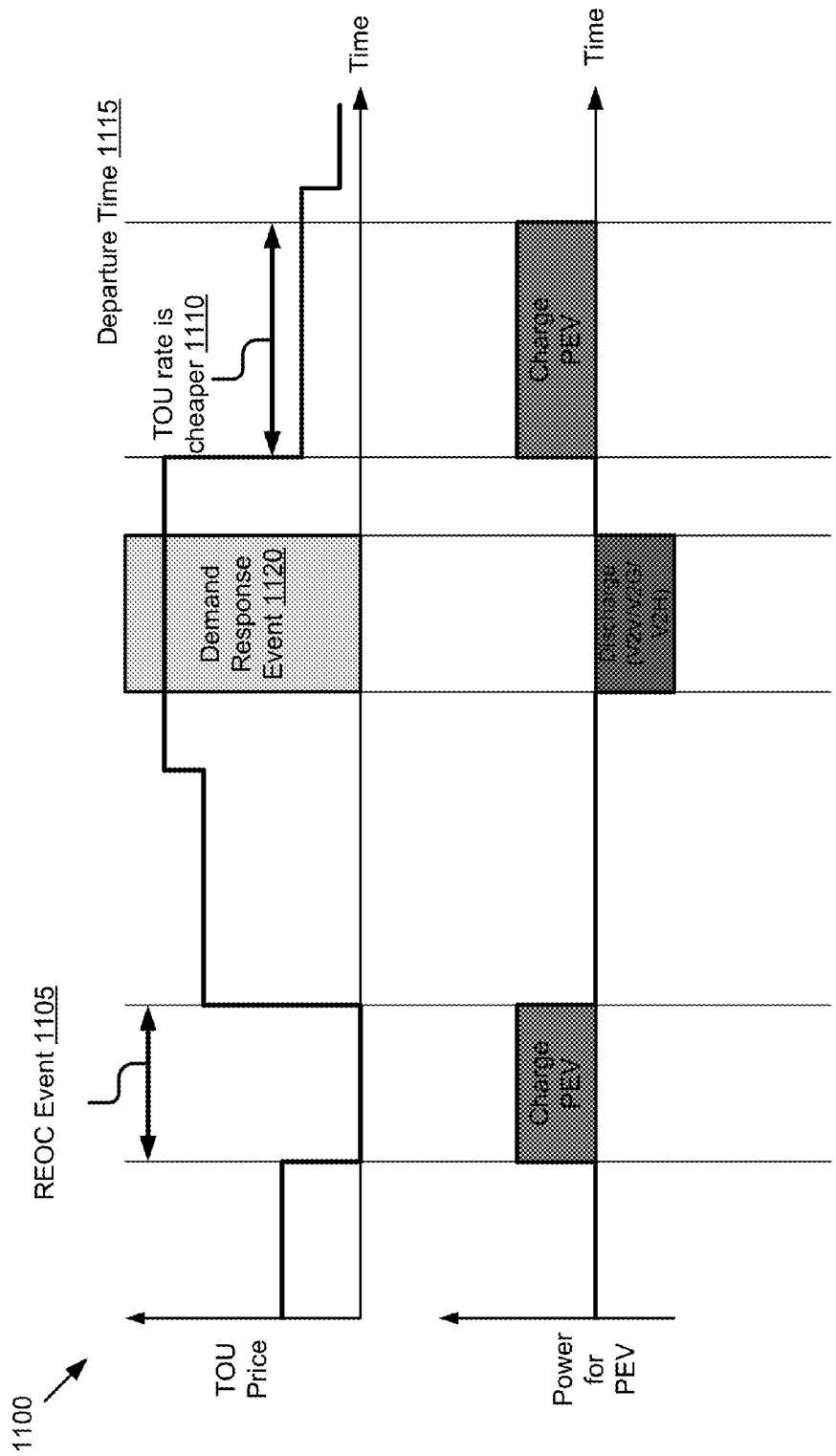
FIG. 11 is a graphic representation illustrating a chart including example responses to a Renewable Energy Output Control event by a Renewable Energy Power Generation facility and an optimization system.

FIG. 11 is a graphic representation illustrating a chart 1100 including example responses to a REOC event by the REPG facility 170 and the optimization system 199.

The TOU price may be described in the charge schedule 193 stored in the memory 227 or the storage 241.

The Power for PEV may describe example vehicle functions implemented by the optimization system 199 responsive to events such as a REOC event 1105, a DR event 1120 or a drop in the TOU price rate 1110.

In the depicted implementation, an REOC event 1105 occurs and during the same time period the optimization system 199 causes the battery system 251 of the PEV 123 to be charged with renewable energy generated by the REPG facility 170. In this way, the REPG facility 170 does not have to stop producing renewable energy or pay to store the renewable energy in a battery bank. The REPG facility also benefits by avoiding the expense associated with building, maintaining and repairing the battery bank, or the waste created by disposing of the batteries in the battery bank. The operator of the PEV 123 benefits, for example, by having renewable energy stored in the battery system 251 which may then be used by the PEV 123, discharged to a second PEV 123 (i.e., vehicle-to-vehicle discharging) or sold to the utility 103 at a later time (i.e., vehicle-to-grid discharging).

In the depicted implementation, a DR event occurs 1120 and during the same time period the optimization system 199 causes the battery system 251 of the PEV 123 to discharge energy stored in the battery system 251.

FIG. 11 indicates that the discharge may be "V2V" or "V2G" or "V2H." "V2V" indicates "vehicle-to-vehicle" in which a first PEV 123 discharges power to a second PEV 123 to charge the battery system 251 of the second PEV 123. "V2G" indicates "vehicle-to-grid" in which a PEV 123 discharges power the power grid 114. "V2H" indicates "vehicle-to-home" in which a PEV 123 discharges power to a home or residence. Accordingly, the vehicle function implemented by the optimization system 199 may include one or more of V2V or V2G or V2H discharging.

In the depicted implementation, the charge schedule 193 indicates that the TOU rate is cheaper 1110 and during the same time period the optimization system 199 causes the charging system 191 to charge the battery system 251 of the PEV 123.

The departure time 1115 for the next journey of the PEV 123 is depicted. In some implementations, the charging of the battery system 251 of the PEV and the discharging of the battery system 251 of the PEV 123 are configured by the optimization system 251 so that the battery system 251 stores enough charge for the PEV 123 to complete the next journey without running out of energy to power the PEV 123.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks.

Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    determining that first event data describes a Renewable Energy Output Control event ("REOC event") including instructions for operating a Renewable Energy Power Generation facility ("REPG facility") during a first duration of the REOC event, wherein the instructions direct the REPG facility to not output power to a power grid during the first duration of the REOC event;
    charging a battery system included in a Plug-in Electric Vehicle ("PEV") during the first duration of the REOC event, wherein the battery system is coupled to the REPG facility via a coupling that does not including the power grid and charged by the REPG facility via the coupling with power generated by the REPG facility during the first duration of the REOC event so that the REPG facility continues to generate power during the REOC event and wherein the battery system is coupled to the power grid;
    determining that second event data describes a Demand Response event ("DR event");
    discharging at least some of the power stored in the battery system to the power grid during a second duration of the DR event;
    estimating a next journey that the PEV will take;
    estimating a departure time when the next journey will start;
    estimating a journey power value describing how much wattage the PEV will consume to complete the next journey;
    determining a PEV power value describing how much wattage the battery system is currently storing;
    calculating a charge time occurring between an end of the DR event and the departure time;
    estimating a charge time power value describing how much wattage can be stored in the battery system during the charge time; and
    determining a maximum discharge value that is a maximum amount of wattage discharged by the battery system of the PEV to the power grid during the DR event so that the battery system is storing the journey power value at the departure time, wherein the maximum discharge value is determined by solving for a following equation: the maximum discharge value=the charge time power value−the journey power value+the PEV power value and the discharging to the power grid is limited to the maximum discharge value.

2. The method of claim 1, further comprising:
    calculating when to start charging the battery system based on a goal of achieving a lowest cost and a battery charge sufficient to meet the journey power value for the next journey.

3. The method of claim 1, further comprising:
    monitoring a wattage of power discharged to the power grid;
    determining a cost of the wattage based on a charge schedule describing the cost of the wattage during the DR event;
    storing discharge data describing the wattage discharged by the battery system of the PEV to the power grid during the DR event and the cost of the wattage; and
    providing the discharge data to a utility for reimbursement based on the cost of the wattage.

4. The method of claim 1, further comprising:
    limiting the discharging during second duration of the DR event so that the battery system is guaranteed to store the journey power value at the departure time.

5. The method of claim 2, further comprising:
    determining how long the REOC event will last;
    estimating how much energy could be sourced from the REPG facility during a time period associated with the REOC event and before the departure time for the next journey; and
    charging the battery system from energy produced by the REPG facility during the REOC event.

6. The method of claim 5, further comprising:
    determining whether there has been a price increase during a present time for a cost of electricity while charging the battery system using the energy produced by the REPG facility during the REOC event; and
    responsive to determining that the price increase occurred, discharging at least some of the power stored in the battery system to the power grid.

7. The method of claim 1, further comprising:
    identifying a time period when a cost of power is expensive relative to historical cost based on a charge schedule describing the cost of the power during the time period and the historical cost; and discharging at least some of the power stored in the battery system of the PEV to the power grid during the time period.

8. The method of claim 7, further comprising:

monitoring a wattage of power discharged to the power grid;

determining a cost of the wattage based on the charge schedule;

storing discharge data describing the wattage discharged by the battery system of the PEV to the power grid during the time period and the cost of the wattage; and providing the discharge data to a utility for reimbursement based on the cost of the wattage.

9. The method of claim 7, wherein the charge schedule is stored as charge schedule data in a non-transitory memory of the PEV.

10. The method of claim 7, wherein the charge schedule is stored as charge schedule data in a non-transitory memory of a charging system that is coupled to the coupling and the PEV to transmit power from the coupling to the PEV.

11. The method of claim 10, wherein the charging system is located within a range of 0.01 centimeters and 100 meters from the PEV.

12. The method of claim 10, wherein the charging system is operated by a user of the PEV.

13. The method of claim 10, wherein the charging system is operated by the REPG facility.

14. The method of claim 10, wherein the charge schedule is published by a utility and transmitted by a first server associated with the utility to the charging system and a second server associated with REPG facility via a network that is communicatively coupled to the charging system, the first server and the second server.

15. The method of claim 14, wherein the network includes a wireless network.

16. The method of claim 14, wherein the utility also publishes the first event data.

17. The method of claim 1, wherein the PEV is an autonomous vehicle.

18. The method of claim 1, wherein the PEV includes an electric engine and a combustion engine.

19. A system comprising:

a Plug-in Electric Vehicle ("PEV") coupled to a charging system;

wherein the PEV includes a battery system operable to be charged by the charging system, a processor and an optimization system, wherein the optimization system includes computer-readable code that, when executed by the processor, cause the processor to perform steps comprising:

determining that event data describes a Renewable Energy Output Control event ("REOC event") including instructions for operating a Renewable Energy Power Generation facility ("REPG facility") during a duration of the REOC event, wherein the instructions direct the REPG facility to not output power to a power grid during the duration of the REOC event;

charging the battery system included in the PEV during the duration of the REOC event, wherein the battery system is coupled to the REPG facility via a coupling that does not including the power grid and charged by the REPG facility via the coupling with power generated by the REPG facility during the duration of the REOC event so that the REPG facility continues to generate power during the REOC event and wherein the battery system is coupled to the power grid;

determining that second event data describes a Demand Response event ("DR event");

discharging at least some of the power stored in the battery system to the power grid during a second duration of the DR event;

estimating a next journey that the PEV will take;

estimating a departure time when the next journey will start;

estimating a journey power value describing how much wattage the PEV will consume to complete the next journey;

determining a PEV power value describing how much wattage the battery system is currently storing;

calculating a charge time occurring between an end of the DR event and the departure time;

estimating a charge time power value describing how much wattage can be stored in the battery system during the charge time; and determining a maximum discharge value that is a maximum amount of wattage discharged by the battery system of the PEV to the power grid during the DR event so that the battery system is storing the journey power value at the departure time, wherein the maximum discharge value is determined by solving for a following equation: the maximum discharge value=the charge time power value the journey power value+the PEV power value and the discharging to the power grid is limited to the maximum discharge value.

20. A computer program product comprising a non-transitory computer-usable medium including a computer-readable program, wherein the computer-readable program when executed on a computer causes the computer to:

determining that event data describes a Renewable Energy Output Control event ("REOC event") including instructions for operating a Renewable Energy Power Generation facility ("REPG facility") during a duration of the REOC event, wherein the instructions direct the REPG facility to not output power to a power grid during the duration of the REOC event;

charging a battery system included in a Plug-in Electric Vehicle ("PEV") during the duration of the REOC event, wherein the battery system is coupled to the REPG facility via a coupling that does not including the power grid and charged by the REPG facility via the coupling with power generated by the REPG facility during the duration of the REOC event so that the REPG facility continues to generate power during the REOC event and wherein the battery system is coupled to the power grid;

determining that second event data describes a Demand Response event ("DR event");

discharging at least some of the power stored in the battery system to the power grid during a second duration of the DR event;

estimating a next journey that the PEV will take;

estimating a departure time when the next journey will start;

estimating a journey power value describing how much wattage the PEV will consume to complete the next journey;

determining a PEV power value describing how much wattage the battery system is currently storing;

calculating a charge time occurring between an end of the DR event and the departure time;

estimating a charge time power value describing how much wattage can be stored in the battery system during the charge time; and determining a maximum discharge value that is a maximum amount of wattage discharged by the battery system of the PEV to the power grid during the DR event so that the battery system is storing the journey power value at the departure time, wherein the maximum discharge value is determined by solving for a following equation: the maximum discharge value=the charge time power value−the journey power value+the PEV power value and the discharging to the power grid is limited to the maximum discharge value.

* * * * *